United States Patent
Georgieva et al.

(10) Patent No.: US 11,201,725 B2
(45) Date of Patent: Dec. 14, 2021

(54) CRYPTOGRAPHY DEVICE HAVING IMPROVED SECURITY AGAINST SIDE-CHANNEL ATTACKS

(71) Applicant: THALES DIS FRANCE SA, Meudon (FR)

(72) Inventors: Mariya Georgieva, Meudon (FR); Aline Gouget, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 15 days.

(21) Appl. No.: 16/768,683

(22) PCT Filed: Nov. 30, 2018

(86) PCT No.: PCT/EP2018/083115
§ 371 (c)(1),
(2) Date: May 31, 2020

(87) PCT Pub. No.: WO2019/106139
PCT Pub. Date: Jun. 6, 2019

(65) Prior Publication Data
US 2021/0194666 A1    Jun. 24, 2021

(30) Foreign Application Priority Data
Dec. 1, 2017 (EP) .................... 17306686

(51) Int. Cl.
*H04L 9/00* (2006.01)
*H04L 9/08* (2006.01)

(52) U.S. Cl.
CPC ............. *H04L 9/002* (2013.01); *H04L 9/008* (2013.01); *H04L 9/0838* (2013.01); *H04L 2209/16* (2013.01)

(58) Field of Classification Search
CPC ....... H04L 9/002; H04L 9/008; H04L 9/0838; H04L 2209/16
See application file for complete search history.

(56) References Cited

U.S. PATENT DOCUMENTS

2020/0074548 A1* 3/2020 Aidoo .................. H04L 9/0897
2020/0358611 A1* 11/2020 Hoang ................ H04L 63/0428

FOREIGN PATENT DOCUMENTS

| WO | WO2011/120125 A1 | 10/2011 |
| WO | WO2013116916 A1 | 8/2013 |
| WO | WO2019106166 A1 | 6/2019 |

OTHER PUBLICATIONS

PCT/EP2018/083115, International Search Report, dated Jan. 9, 2019, European Patent Office, P.B. 5818 Patentlaan 2 NL—2280 HV Rijswijk.

(Continued)

*Primary Examiner* — Ashokkumar B Patel
*Assistant Examiner* — William B Jones
(74) *Attorney, Agent, or Firm* — The Jansson Firm; Pehr B. Jansson

(57) ABSTRACT

Secure cryptography operations on a white-box cryptography device. Receiving a first message. Receiving a cryptographic key encrypted using a homomorphic encryption scheme. Performing a cryptographic operation, e.g., decryption or digital signature, using the encrypted cryptographic key. Performing a homomphically encrypted tracer calculation that traces the performance of the cryptography operations on the white-box cryptography device thereby allowing verification that all steps of the cryptography operation has been performed without external manipulation. Performing a key-exchange operation. Decrypting the key-exchange output using an alternate cryptographic key stored on the cryptographic device.

16 Claims, 13 Drawing Sheets

(56) References Cited

OTHER PUBLICATIONS

PCT/EP2018/083115, Written Opinion of the International Searching Authority, dated Jan. 9, 2019, European Patent Office, D-80298 Munich, Germany.
Chillotti Ilaria et al: "Faster Packed Homomorphic Operations and Efficient Circuit Bootstrapping for TFHE", (Nov. 30, 2017), Medical Image Computing and Computer-Assisted Intervention—MICCAI 2015 : 18th International Conference, Munich, Germany, Oct. 5-9, 2015; Proceedings; [Lecture Notes in Computer Science; Lect. Notes Computer], Springer International Publishing, CH, XP047455824, ISSN: 0302-9743, ISBN: 978-3-642-38287-1 [retrieved on Nov. 30, 2017] the whole document.
Emmanuela Orsini et al: "Bootstrapping BGV Ciphertexts With a Wider Choice of p and q", International Association for Cryptologic Research, vol. 20140930:085538, (Sep. 3, 2014), pp. 1-20, XP06107014, the whole document.
Stanley Chow et al: "White-Box Cryptography an an AES Implementation", Selected Areas in Cryptography: 9th Annual International Workshop, SAC 2002, (Aug. 15, 2002), XP002769828, cited in the application the whole document.
Chow S et al: "A White-Box DES Implementation for DRM Applications", Internet Citation, 2002, XP002476832, Retrieved from the Internet: URL:http://crypto.stanford.edu/DRM2002/whitebox.pdf [retrieved on Apr. 16, 2008] cited in the application the whole document.
PCT/EP2018/083184, International Search Report, dated Jan. 30, 2019, European Patent Office, P.B. 5818 Patentlaan 2 NL—2280 HV Rijswijk.
PCT/EP2018/083184, Written Opinion of the International Searching Authority, dated Jan. 30, 2019, European Patent Office, D-80298 Munich, Germany.
Berbain Come et al: "QUAD: A Practical Stream Cipher with Provable Security", (May 28, 2006), Medical Image Computing and Computer-Assisted Intervention—MICCAI 2015 : 18th International Conference, Munich, Germany, Oct. 5-9, 2015; Proceedings; [Lecture Notes in Computer Science; Lect.Notes Computer], Springer International Publishing, CH, XP047422747, ISSN: 0302-9743 ISBN: 978-3-319-69952-3 section 3.

\* cited by examiner

CRYPTOGRAPHY DEVICE HAVING IMPROVED SECURITY AGAINST SIDE-CHANNEL ATTACKS

BACKGROUND OF THE INVENTION

The present invention generally relates to cryptography devices, and more particularly to cryptography devices that avoid manipulation of secret data, such as keys and random number generator seeds, in plaintext to thereby be more resilient to side-channel attacks including whitebox attacks designed to discern such secret data.

Broadly, cryptography provides mechanisms by which a private plaintext message may be protected from being divulged by converting the message into a ciphertext that may only be deciphered, i.e., converted back into the plaintext by specific persons or entities that are privy to a secret key required for performing the deciphering operation.

Two major categories of cryptography are secret key cryptography and private-key-public-key cryptography (herein, simply referred to as public key cryptography). The former includes the Digital Encryption Standard (DES) and the Advanced Encryption Standard (AES). The latter includes Rivest-Shamir-Adelman (RSA).

In secret key cryptography, the encrypting party and the decrypting party share a secret key (the shared secret key) that is used to both encrypt and decrypt a message. In public key cryptography, the recipient of a ciphertext message, i.e., the decrypting party, has a private key or secret key required to decipher ciphertext messages encoded with the public key. In other words, there is an association between a particular private key and a particular public key; they form a key pair. The public key is made available to anyone who wishes to send an encoded message (a ciphertext message) whereas the corresponding secret key is kept secret by the intended recipient of messages.

Public key cryptography also allows creation of digital signatures. The private key is used to sign a message and the public key to verify the signature.

Traditionally, cryptography relied on a message being turned into a ciphertext, that only sender and/or recipient would know the required keys, and that the encryption, decryption, and digital signature processes would not be available for a nefarious person trying to discern the secret message (or sign the message). Keys were protected by not giving access to the machines that were used to decrypt/sign a text. The endpoints of a communication are trusted and the communication channel between the endpoints is protected by turning messages into ciphertext that cannot be decrypted without access to the required decryption key. This is referred to as black box cryptography.

However, there are situations where the cryptography device has to be made available on open devices to a party that not necessarily should have access to the cryptography key. For example, in a digital rights management (DRM) scenario a publisher may wish to make a DRM protected work available to a subscriber. As long as the subscriber satisfies the terms of the subscription, the work is available. However, at the end of a subscription term, the subscriber should not have access to the work.

The open nature of these systems—whether PCs, tablets, or smart phones—renders the cryptography software extremely vulnerable to attack because the attacker has complete control of the execution platform and of the software implementation itself. The attacker can easily analyze the binary code of the cryptography application and, for example, memory pages used for temporary storage during the execution by intercepting system calls, tampering with the binary or execution files. Such manipulation may, for example, be performed using debuggers and hardware emulation tools.

These attacks include trace execution, examination of intermediate results, and access to keys located in memory as well as the performance of static analysis on the cryptography software and alteration of sub-computations for perturbation analysis.

If the work is protected through cryptography, the decryption/signing key may be provided on the subscriber's cryptography device, e.g., a mobile device such as a mobile telephone, in a manner such that the key can be used by the device to decrypt or to sign the work without revealing either the key or the algorithm to the subscriber. The key might be hidden in some way inside the code implementing the decryption or signature algorithm may be obfuscated so that it is very difficult to determine any information about the value of the key. This scenario is referred to as white-box cryptography.

White-box cryptography was first described by Chow et al. in [Chow AES] Stanley Chow, et al., *White-Box Cryptography and an AES Implementation*, in *Proceedings of the $9^{th}$ International Workshop on Selected Areas in Cryptography* (SAC 2002), volume 2595 of *Lecture Notes in Computer Science*, pp. 250-270. Springer, 2002 and in [Chow DES] Stanley Chow, et al., *White-Box Cryptography DES Implementation for DRM applications*, in *Proceedings of the ACM Workshop on Security and Digital Rights Management* (*DRM* 2002), volume 2696 of *Lecture Notes in Computer Science*, pp. 1-15. Springer, 2002. [Chow AES] and [Chow DES] are both incorporated herein by reference in their entireties.

However, hitherto, all practical white-box cryptography approaches have been broken. Therefore, there is still an unmet need to provide cryptography devices that protect cryptographic keys from being divulged.

A possible mechanism for protecting encrypted data from being divulged during computations made on the data is homomorphic encryption. Homomorphic encryption allows computations to be performed on ciphertext values such that computation results when decrypted are the same values as if the computations were performed on corresponding plaintext values.

There are several approaches to homomorphic encryption that exhibit the homomorphic property over one operation. For example, the ElGamal cryptography system ([Elgamal] T. Elgamal, *A public key cryptosystem and a signature scheme based on discrete logarithms*, IEEE Transactions on Information Theory (Vol. 31, Issue. 4, July 1985)) is homomorphic over multiplication. Similarly, the Paillier cryptosystem (Paillier, Pascal "Public-Key Cryptosystems Based on Composite Degree Residuosity Classes". *EUROCRYPT*. Springer. pp. 223-238, 1999) is homomorphic over addition.

A very powerful, albeit computationally expensive, cryptography mechanism, known as fully homomorphic encryption (FHE), was introduced by Craig Gentry in 2009 in [Gentry] *Fully Homomorphic Encryption Using Ideal Lattices*, in Proceedings of the forty-first annual ACM symposium on Theory of computing (STOC '09), pp. 169-178. ACM, 2009. [Gentry] is incorporated herein by reference in its entirety. Broadly, in FHE, calculations may be performed on encrypted values, with results decrypted, to produce results that are the same as if the calculation had been performed on corresponding plaintext values. FHE provides for the application of an arithmetic circuit to a set of ciphertexts wherein the result is an encrypted value that would be the same as if it had been evaluated on the underlying plaintext. To be considered fully homomorphic, the encryption scheme allows for computations using arbitrary functions and is capable of evaluation of any circuit.

FHE has been suggested for use to encrypt secret key cryptography algorithms, notable AES. See, [GHS] Craig Gentry, Shai Halevi, Nigel P. Smart, *Homomorphic Evaluation of the AES Circuit, CRYPTO* 2012 (a version may be found in http://eprint.iacr.org/2012/099.pdf (accessed on Dec. 3, 2016). In this article, the use case is that a cloud service may compute $\{M\}_{EK_{FHE}}$ from $\{K\}_{EK_{FHE}}$ and $\{C\}_{EK_{FHE}}$ such that C=AES [K](M). The cloud service provider sends $\{M\}_{EK_{FHE}}$ to the client, which may decrypt the message $\{M\}_{EK_{FHE}}$ using $DK_{FHE}$ to obtain the plaintext M. EK and DK are encryption key and decryption key, respectively; in the case of shared secret cryptography, EK and DK are the same whereas for public-key cryptography, EK and DK are, respectively, the public key and private key of the recipient.

Unfortunately, FHE is computationally very expensive and is rarely practical to use in real-world use cases. A middle-ground are so-called somewhat homomorphic encryption systems, which limit the homomorphic property to certain calculations beyond a single operation, e.g., evaluation of low-degree polynomials over ciphertext data.

Homomorphic encryption has been considered for use in white-box cryptography. See e.g., [Wyseur] *White-Box Cryptography*, Brecht Wyseur (COSIC) Ph.D. thesis, (2009), http://www.cosic.esat.kuleuven.be/publications/thesis-152.pdf (accessed on Aug. 29, 2016).

However, there are problems associated with use of homomorphic encryption in a white-box environment. In the white-box environment, the homomorphic decryption is performed by the same entity as the one that computes the homomorphic operations. This access to the algorithm places some vulnerability on the security of the mechanism.

Other problems associated with deployment of homomorphic encryption in white-box cryptography include, first, if the calculation is performed on encrypted data, the encryption result is also encrypted. There needs to be a mechanism for allowing the cryptography device to convert securely the result into a plaintext. Second, fundamental to any cryptographic calculation is knowledge that the entire calculation is performed. For example, for a block cipher such as AES, if all inputs to a cryptographic operation are encrypted, there is no mechanism available to verify that all rounds of the block cipher and all steps of those rounds have been performed.

From the foregoing it will be apparent that there is still a need for improving the security of devices that rely on white-box cryptography for performing cryptography operations.

DETAILED DESCRIPTION OF THE INVENTION

Figure 1:
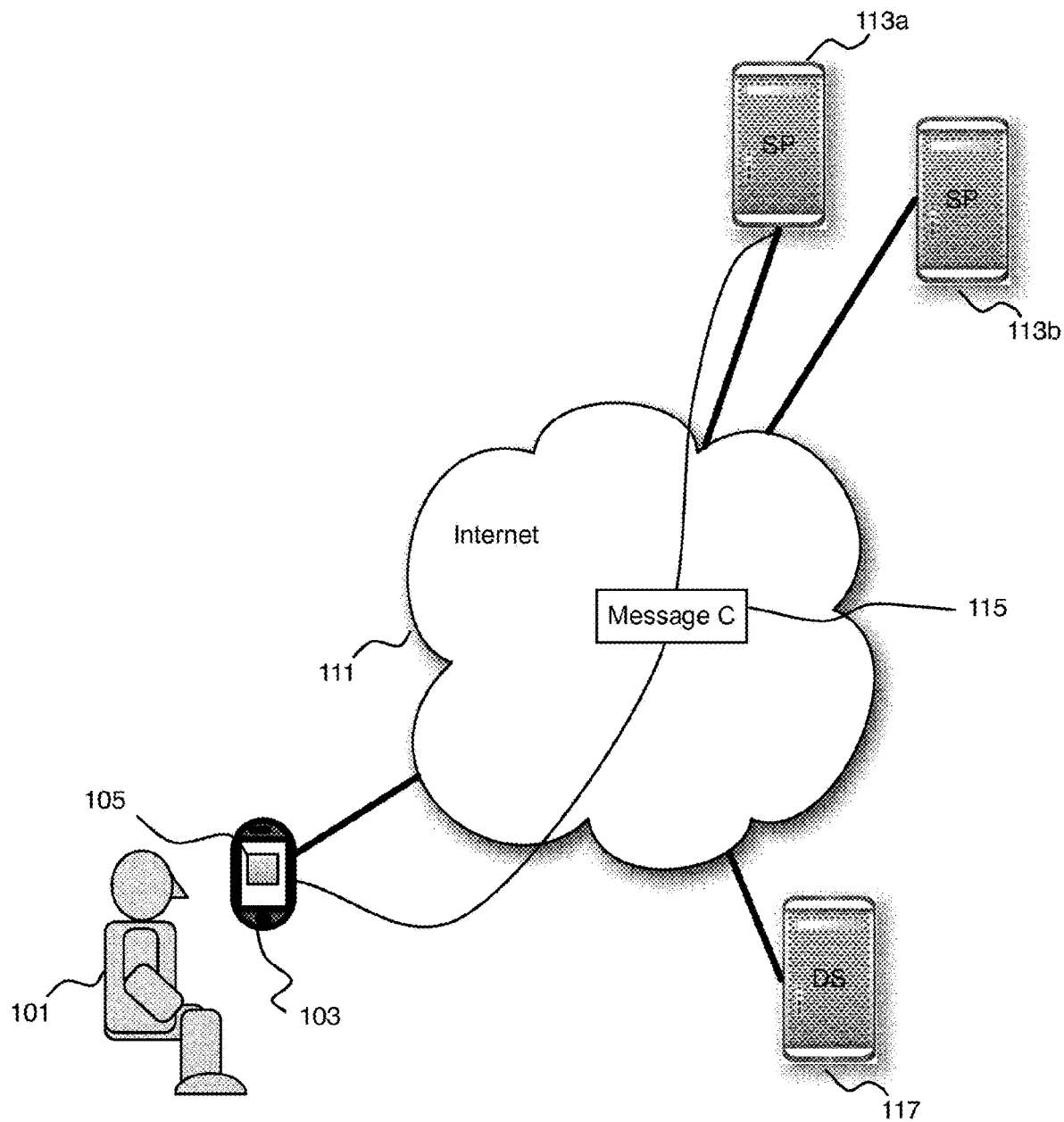
FIG. 1 is a schematic illustration of a mobile device optionally connected over a network to one or more servers from which the mobile device may obtain materials which it would perform cryptographic operations on, for example, for obtaining access to digital rights management protected content.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a cryptographic device, e.g., a mobile telephone, a tablet, or a personal computer executes a white-box cryptography mechanism using homomorphic, fully homomorphic, or somewhat fully homomorphic encryption to protect a secret entrusted to the cryptographic device, e.g., a secret key (K) used to encrypt and/or decrypt or to cryptographically sign, for example, using a block cipher such as the Advanced Encryption Standard (AES) algorithm or the RSA algorithm for signature (RSA is named after it's inventors, Rivest, Shapiro, and Adleman), from attacks intended to discern the protected secret.

FIG. 1 is a schematic illustration of a network 111 connecting a cryptographic device 103, e.g., a mobile telephone, a tablet, or a personal computer, to one or more remote servers 113. The cryptographic device 103 is operated by a user 101 who interacts with one of the servers 113 via a web browser window 105 of a web browser. In the example scenario illustrated in FIG. 1, the cryptographic device 103 provides the cryptographic operations on behalf of the user 101, e.g., to decrypt messages, e.g., message C 115, which may correspond to a plaintext message M, and which is received from the remote server 113a. The messages may be a DRM protected content, such as a computer program or a music library. The message C 115 may also be provided to the cryptographic device 103 to obtain a cryptographic digital signature by the cryptographic device 103.

While FIG. 1 provides an illustration of one scenario in which cryptography may play an important role, there are many other important uses for cryptography. Thus, the technology described herein is not limited in its application to the usage example illustrated in FIG. 1.

Figure 5:
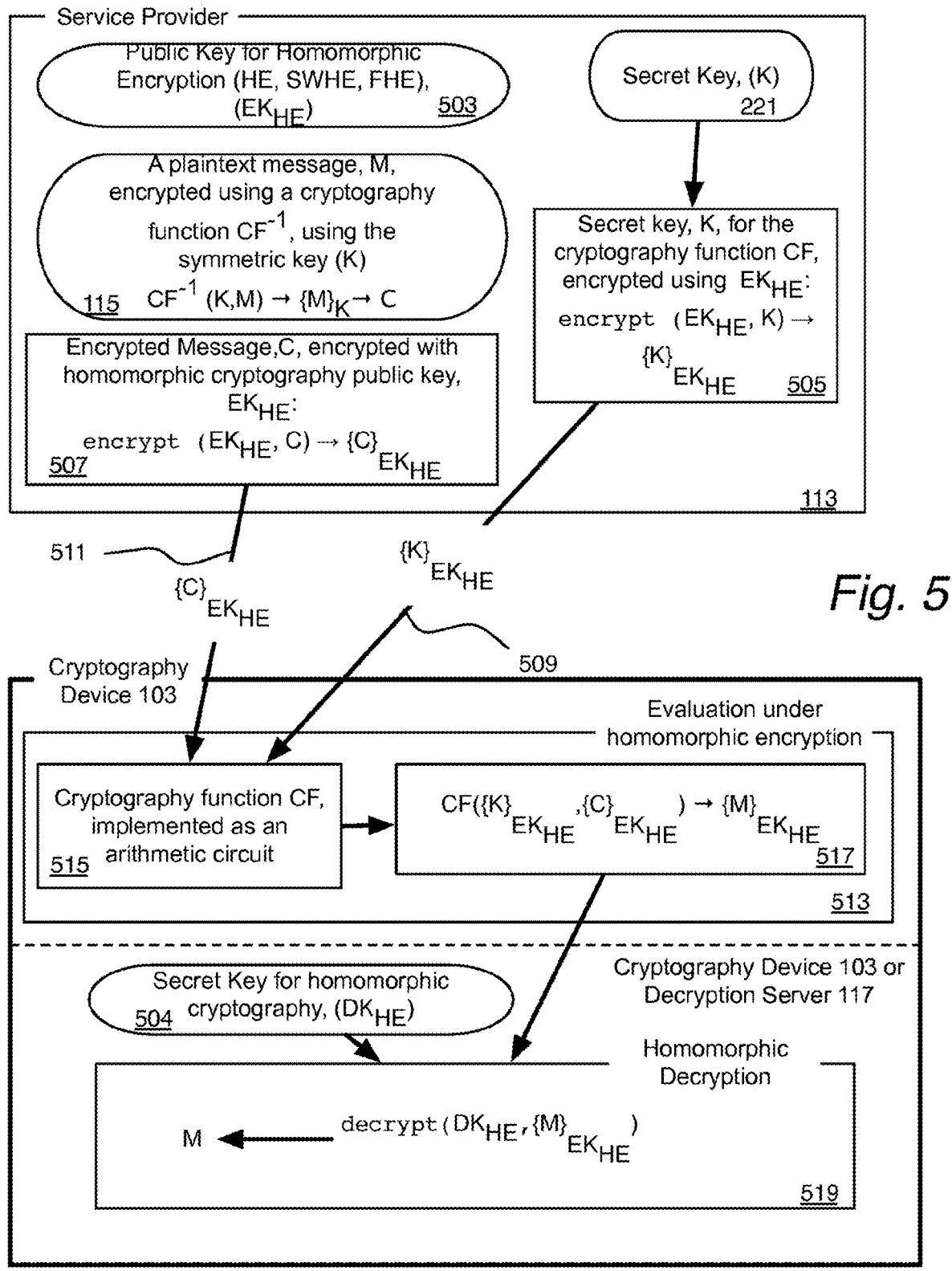
FIG. 5 a schematic illustration illustrating the use of homomorphic encryption scheme in a white-box cryptography mechanism in a cryptographic device performing a cryptographic operation.

In one embodiment, discussed in conjunction with FIG. 5 a decryption server 117 operates to perform a portion of the process of decrypting the message C 115.

Figure 2:
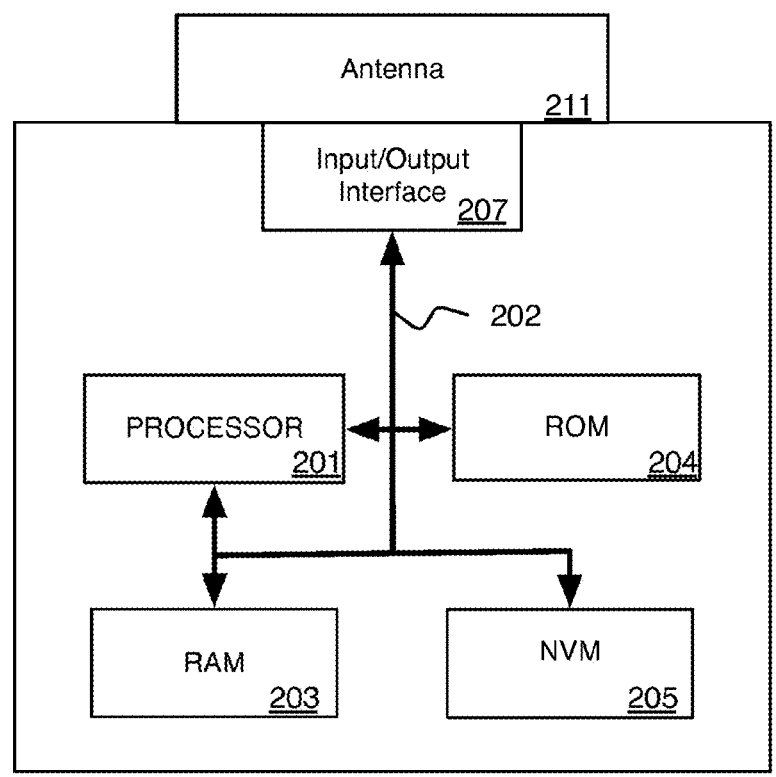
FIG. 2 is a schematic illustration of a cryptography device, e.g., a mobile device such as a mobile telephone or tablet.

FIG. 2 is a schematic illustration of a cryptography device 103, for example, a mobile telephone, tablet, or personal computer. The cryptography device 103 may include a processor 201 connected via a bus 202 to a random access memory (RAM) 203, a read-only memory (ROM) 204, and a non-volatile memory (NVM) 205. The cryptography device 103 further includes an input/output interface 207 for connecting the processor 201, again typically via the bus 202, to a connector 211 by which the cryptography device 103 may be connected to an antenna 211 by which the cryptography device 103 may connect to various forms of wireless networks, e.g., wide-area networks, WiFi networks, or mobile telephony networks. Alternatively, the cryptography device 103 may connect to networks via wired network connections such as Ethernet.

Figure 3:
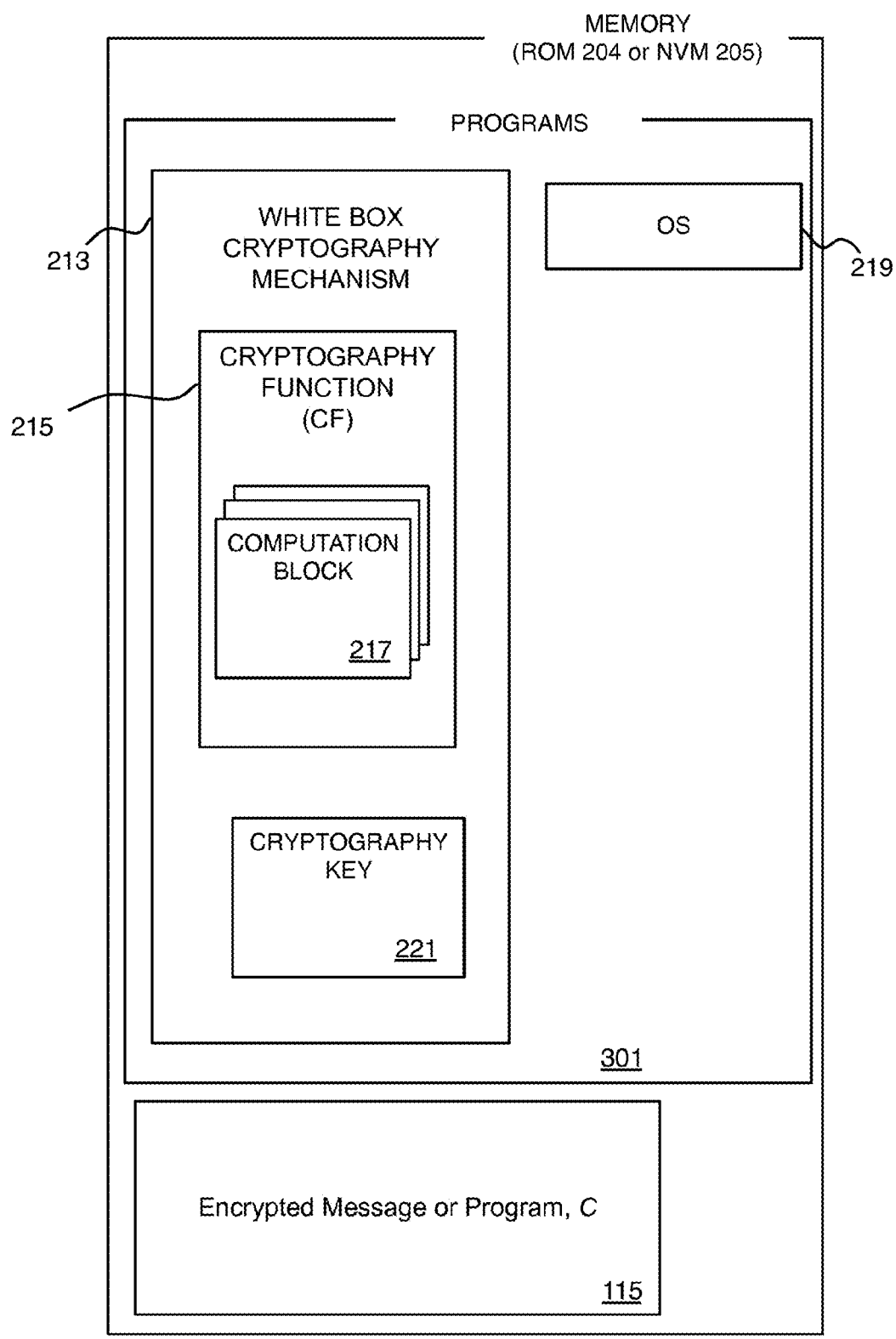
FIG. 3 is a schematic illustration of programs and data stored in a memory of the cryptography device of FIG. 2.

The ROM 204 and/or NVM 205 may include computer programs 301 as is illustrated in FIG. 3. While it is here depicted that the computer programs 301 are all co-located in the ROM 204 or the NVM 205, in actual practice there is no such restriction as programs may be spread out over multiple memories and even temporarily installed in RAM 203. Furthermore, the portable security device 109 may include multiple ROMs or NVMs. The programs 301 include operating system programs 219 as well as application programs loaded onto the cryptography device 103.

In a preferred embodiment, the programs include a white-box cryptography mechanism 213. While depicted in FIG. 3 as a distinct module 213, in many implementations a white-box cryptography mechanism may be implemented as several tables, which, for obfuscation reasons, may be scattered about in the memory 205. Such implementation details are outside the scope of this document.

The cryptography mechanism 213 of the cryptography device 103, implements one or more cryptography functions (CF) 215, which may be an implementation of a block cipher such as AES, may be implemented as several computation blocks (BC) 217.

The ROM 204 or NVM 205 may also contain private data, such as a cryptography key 221, stored either in its basic form or as derived quantities. As noted hereinbelow, in a preferred embodiment, the white-box cryptography mechanism executes one or more cryptography functions (CF) 215, which requires a secret key to perform its operation. While in many white-box cryptography mechanisms the secret key is a shared secret key stored on the cryptography device 103, in a preferred embodiment, the secret key that would ordinarily be used to decrypt the message C is not stored on the cryptography device 103 in cleartext form; rather, it is received from a server in an encrypted form and undergoes a key-switch operation. The details of the mechanism by which a stored cryptography key 221 is used instead of the secret key in conjunction with the white-box cryptography mechanism 213 are described in greater detail below.

Thus, the cryptography device 103 may receive a document, a message, or an encrypted program as the encrypted message C 115 via the connector 211. The processor 201 may decrypt the document/message using the cryptography key 221 by executing instructions of the cryptography module 213 according to the mechanism described hereinbelow. Alternatively, the cryptographic module 213 may provide digital signature services, in which case the signs the message using the cryptography key 221.

Figure 4:
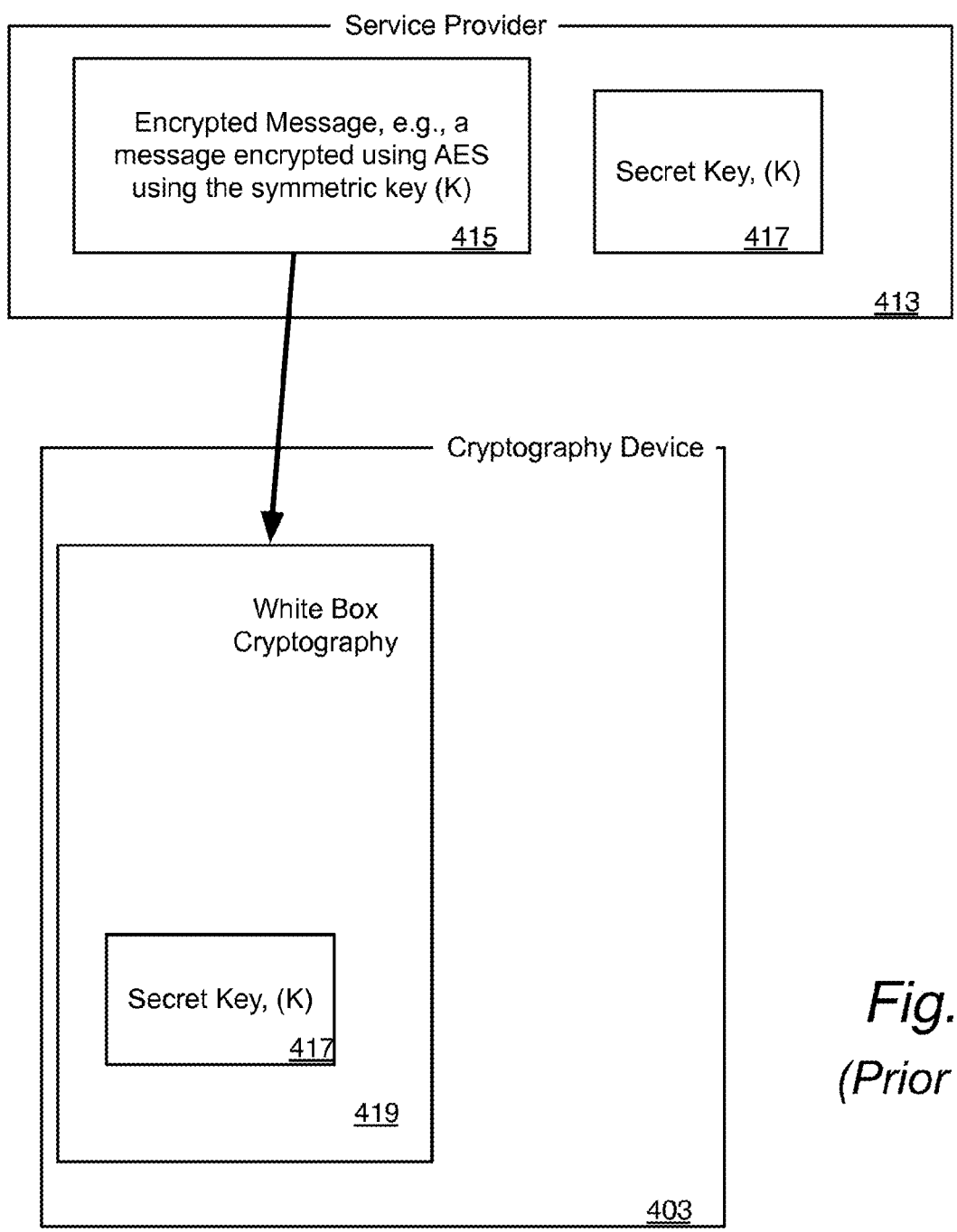
FIG. 4 is a high-level schematic illustration of a mobile device having a white-box cryptography module program listing that may be stored in the memory of a cryptography device as illustrated in FIG. 3 and which performs a cryptographic operation, e.g., an Advanced Encryption Standard (AES) decryption, to obtain access to a message obtained from a server.

FIG. 4 is a high-level schematic illustration illustrating a prior art embodiment white-box cryptography mechanism. A service provider 413 (analogous to the service provider 113 of FIG. 1) may provide an encrypted message M 415 to the cryptography device 403 (analogous to device 103 of FIG. 1). The message 415 is encrypted using a secret key K 417, e.g., a shared secret known to both the service provider 413 and the cryptography device 403 or a private key of the cryptographic device 403.

A white-box cryptography mechanism 419 executing on the cryptography device 403 decrypts the message 415 using the secret key 417 stored on the cryptography device 403. In a prior art white-box cryptography mechanism 419, the cryptography algorithms may be implemented as a set of tables stored in memory with the secret key 417 hidden within these tables.

As is discussed hereinbelow, in a preferred embodiment white-box cryptography mechanism the secret key K is not stored in cleartext on the cryptography device 103. Rather, secret key K is provided in an encrypted form to the cryptography device 103.

FIG. 5 is a block diagram illustrating data flow of a preferred embodiment white-box cryptography that utilizes homomorphic encrypt (HE), somewhat homomorphic encryption (SHE), or fully homomorphic encryption (FHE) to protect a secret key K 221 (from FIG. 3 and analogous to the secret key 417 of FIG. 4) from being discerned by an attacker on the cryptography device 103. As SHE and FHE are homomorphic over one operator (as well as providing additional functionality), homomorphic encryption is here used to encompass SHE, FHE, and homomorphic cryptosystems that are homomorphic at least over one operator.

The ElGamal cryptosystem, which is homomorphic over multiplication, is described in [Elgamal], incorporated herein in its entirety. Fully homomorphic encryption (FHE) was introduced by Craig Gentry in [Gentry], incorporated herein in its entirety. In the context of describing his solution for FHE, Gentry also describes somewhat homomorphic encryption (SHE). An FHE, by definition, is a mechanism in which an arbitrary arithmetic circuit may be applied to a ciphertext yielding the same result as if the arithmetic circuit had been applied to the corresponding plaintext. Consider a ciphertext (C) and corresponding plaintext (M), encrypted using FHE, such that:

$$C=\{M\}_{key_{FHE}}$$

and an arithmetic circuit AC (parameter), then
decrypt ($K_{FHE}$, AC(C))=AC (M)
In other words, performing the arithmetic operations associated with the arithmetic circuit on the plaintext message results in the same result as if the arithmetic operations are performed on the corresponding ciphertext followed by a decryption of the result.

FHE schemes allow computations of arbitrary functions implemented as arithmetic circuits. According to a preferred embodiment, an FHE scheme is used to evaluate a cryptographic function in a white-box environment. In this scheme, illustrated in FIG. 5, consider the following definitions:

CF, $CF^{-1}$—are complementary cryptography functions of a cryptographic mechanism, e.g., decryption and encryption using a block cipher such as AES (because the direction of processing is not material to the discussion herein, for ease of reading, "CF" is used herein in operations that occur in more places in the description even if these would typically be denoted $CF^{-1}$; thus, the designation CF or $CF^{-1}$ should not be interpreted to apply specifically to encryption or decryption, but as generic inverses of one another).

CF (key, message)—application of the cryptography function to message using key K K—secret key for the cryptography function C—An encrypted message (corresponding to a plaintext message M) to be processed by the cryptography function SHE—Somewhat homomorphic encryption, e.g., a cryptosystem that limits the homomorphic property to certain calculations beyond a single operation, e.g., evaluation of low-degree polynomials over ciphertext data FHE—Fully homomorphic encryption $EK_{HE}$, $DK_{HE}$—key pair for homomorphic associated with the cryptography device 103. In one class of embodiments the cryptographic scheme is based on a shared secret. In that case, $EK_{HE}$, $DK_{HE}$ are the same shared secret. In other embodiments, the cryptography scheme is based on public key cryptography. In this case, $EK_{HE}$, $DK_{HE}$ are public key and private key, respectively.

encrypt (key, message)—the encryption of message using key $\{M\}_{key}$—Message M encrypted using key, i.e., encrypt (key, message)→$\{message\}_{key}$;
the form of encryption is implicit from the key, e.g., $\{M\}_{EK_{HE}}$ is an HE encryption of M using the key $EK_{HE}$.

decrypt (key, message)—the decryption of message using key, i.e., decrypt (key, $\{M\}_{key}$)→M FIG. 5 depicts two or three entities: a service provider 113, a cryptographic device 103, and, optionally, a decryption server 117 (as discussed in greater detail below, certain operations may be performed in one embodiment on the cryptographic device 103 or, in other embodiments, on a decryption server 117).

The service provider 113 stores the secret key, K, 221 and the public key for fully homomorphic encryption, $EK_{HE}$, 503. In one embodiment, the corresponding secret key, $DK_{HE}$, 504, is stored on the device performing a decryption of a result from an homomorphic evaluation, described hereinbelow.

The service provider also stores or computes the message, C, 115, which may be a message encrypted using cryptographic function $CF^{-1}$, e.g., using a block cipher, e.g., AES, using the secret key, K, 221. Thus, in one embodiment C is:

$$C=\{M\}_K=CF(K,M)$$

The service provider 113 performs a homomorphic encryption on both the secret key, K, 221, step 505, and the message, C, 115, step 507, thereby producing the quantities $\{K\}_{EK_{HE}}$ and $\{C\}_{EK_{HE}}$, respectively. Details of the mathematics of homomorphic encryption are outside of the scope of this application. However, as noted, HE over multiplication is described in [Elgamal] and FHE as well as SHE are described in [Gentry], use of FHE in white-box cryptography, in [Wyseur], and, white-box AES implementations, in [GHS], all of which are incorporated herein by reference in their entireties.

The quantities $\{K\}_{EK_{HE}}$ and $\{C\}_{EK_{HE}}$ are then transmitted to or loaded on the cryptography device 103, steps 509 and 511, respectively.

On the cryptography device 103, the cryptographic function CF is evaluated under homomorphic encryption, 513. The cryptographic function CF may be an inverse of the cryptographic function $CF^{-1}$ performed by the service provider 113, for example, decryption. Evaluation under homomorphic encryption 513 entails conversion of the cryptographic function CF into an arithmetic circuit 515, which is installed on the cryptography device 103. As an arithmetic circuit compliant with the particular homomorphic encryption algorithm, computations performed on the data input thereto conform with the homomorphic encryption property described hereinabove. Thus, when the arithmetic circuit 515 uses the key $\{K\}_{EK_{HE}}$ to evaluate $\{C\}_{EK_{FHE}}$, the resulting output is $\{M\}_{EK_{HE}}$ 517, i.e., the original plaintext message M HE-encrypted using the key $EK_{HE}$.

A problem with the above-described use of homomorphic encryption in a white-box environment is that the desired output from the cryptography function, CF(K,C), is encrypted as $\{M\}_{EK_{HE}}$. Thus, the result must be decrypted, i.e., using the process illustrated here as homomorphic decryption process 519, which may be performed either directly on the cryptographic device 103 or, optionally, on the decryption server 117. Whichever device is performing the homomorphic decryption stores the homomorphic secret key, $DK_{HE}$, 504, and uses it to decrypt the result from the homomorphic evaluation 513, step 521:

$$M=\text{decrypt}(DK_{HE},\{M\}_{EK_{HE}})$$

Furthermore, not illustrated in FIG. 5 the message, C, 115 and the secret key, K, 221 may require some initial formatting to be compatible with a particular homomorphic cryptography algorithm, e.g., padding to a particular size. For enhanced security, the format, the padding and size may be kept secret and would be specific to a particular homomorphic cryptography scheme and may be used, as described hereinbelow, as an additional verification. The formatting requirement prevents the decryption of $DK_{HE}$ using $DK_{HE}$.

By performing the cryptographic operation under homomorphic encryption the key K is protected because the entire operation is performed on encrypted quantities $\{K\}_{EK_{HE}}$ and $\{C\}_{EK_{HE}}$. Thus, an attacker's attempts to observe intermediate values or any side-channel leakage from the calculations would have no relevance to the actual value of K.

Figure 6:
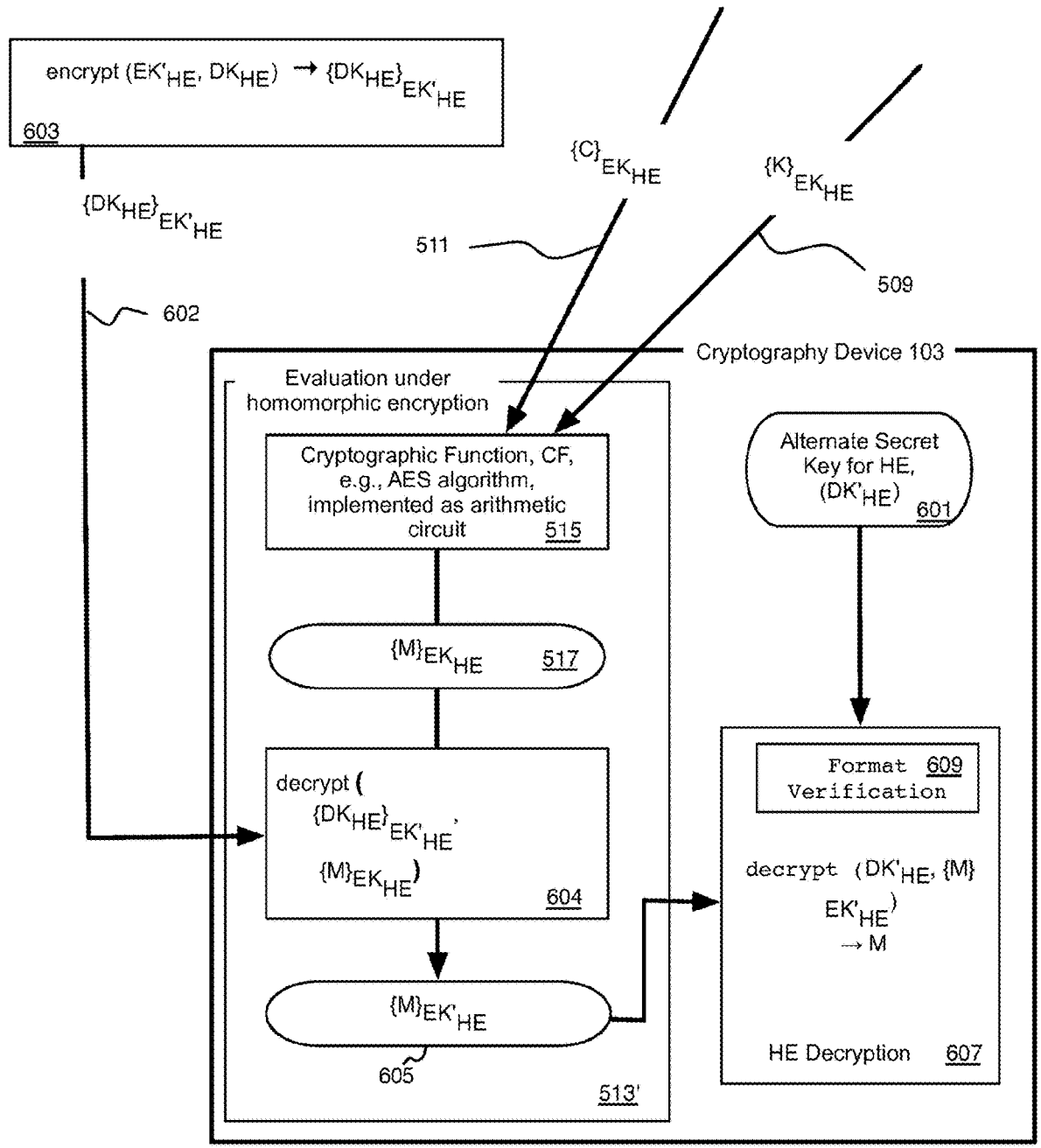
FIG. 6 a schematic illustration providing an embodiment of the mechanism of FIG. 5 in which a cryptographic device performs a key-switch operation while performing an FHE white box mechanism to perform a cryptographic operation.

In a first alternative embodiment, illustrated in FIG. 6, the cryptography device 103 (or the decryption server 117) performs a key-switch operation while performing an homomorphic cryptographic white box mechanism to perform a cryptographic operation. Hereinbelow, the homomorphic decryption for this and other alternative embodiments is described as if performed entirely on one cryptography device 103. However, the process may be split such that final decryption and verification steps are performed on a separate decryption server 117).

The mechanism illustrated in FIG. 6 avoids storing the secret key 221, K, of the cryptography function in cleartext by performing a key-switch operation based on the bootstrapping concept of Gentry. Gentry's bootstrapping concepts allows for the conversion of a ciphertext encrypted using a first public key, $EK_1$, into a ciphertext that is encrypted using a second public key, $EK_2$, without decrypting the ciphertext. Thus, bootstrapping allows for encrypting the message M with a public key for which the corresponding secret key is not stored on the cryptographic device 103 and to convert the message into a ciphertext that may be decrypted using a private key that is stored on the cryptographic device 103, but which corresponds to another public key.

More specifically, contrary to the embodiment of FIG. 5 the homomorphic cryptography secret key 504, $DK_{HE}$, is not stored on the cryptographic device 103. Rather, an alternate homomorphic cryptography secret key 601, $DK'_{HE}$, is stored on the cryptographic device 103. As illustrated in FIG. 5 the service provider 113 transmits the quantities $\{K\}_{EK_{HE}}$ and $\{C\}_{EKPK_{HE}}$, 509 and 511, respectively. Furthermore, in the embodiment of FIG. 6, the cryptographic device 103 is provided, step 602, with the homomorphic cryptography secret key $DK_{HE}$ encrypted using the alternate homomorphic cryptography public key $EK'_{HE}$ corresponding to the alternate homomorphic cryptography secret key DK HE 601 stored on the cryptographic device 103, i.e., the cryptography device is provided with:

$$\{DK_{HE}\}_{EK'_{HE}}$$

which may be calculated 603 and stored on the service provider 113 or on another server.

As in FIG. 5, the cryptography device 103 includes the cryptography function CF implemented as an arithmetic circuit 515 which may be executed to satisfy the requirements of being homomorphic. Using the arithmetic circuit 515, the cryptography function CF decrypts the message $\{C\}_{EK_{HE}}$, 511 using the key $\{K\}_{EK_{HE}}$ 509 producing $\{M\}_{EK_{HE}}$ 517.

Rather than using the secret key, $DK_{HE}$, to decrypt the $\{M\}_{EK_{He}}$ 517, a key-switching operation is performed using the homomorphic bootstrapping technique. The homomorphic encrypted message $\{M\}_{EK_{HE}}$ 517 is decrypted using the received (in step 602) homomorphic cryptography key, $\{DK_{HE}\}_{EK'_{HE}}$, step 604. Because of the homomorphic property, wherein the result of a calculation performed on ciphertext values produces the same result as if the calculation were performed on plaintext values followed by an encryption, the resulting value 605 is $$\{M\}_{EK'_{HE}}$$

i.e., it is a value that is the same as if M had been encrypted using $EK'_{HE}$ and, consequently, it may be decrypted using the alternate homomorphic cryptography secret key, $DK'_{HE}$ 601, step 607. As noted above, the decryption step 607 may be performed by a separate decryption server 117 or directly on the cryptography device 103.

Because the decryption of the message, M, 115 is performed using the encrypted secret HE key, $DK'_{HE}$ 601, the secret key, K, is protected because to discern the secret key K an attacker would (1) have to realize that a key switch using bootstrapping is part of the algorithm, (2) must know how to perform such a key-switch operation, and (3) would have to first decrypt $DK_{HE}$ from $\{DK_{HE}\}_{EK'_{HE}}$ 602 and then decrypt $\{K\}_{DK_{HE}}$ using $DK_{HE}$.

In one embodiment, the decrypt( ) function is implemented to verify 609 the format of the input message. As noted above, in a preliminary step, the message, C, 115 and the key, $DK'_{HE}$, 601 may be formatted into a secret format wherein the format and the padding used are kept secret. Correct execution of the evaluation of cryptography function CF under homomorphic encryption would preserve that format in the input to the decryption operation 607. The decrypt( ) function may be implemented to verify that its input conforms to the correct format for a message and refuse operation on any input that does not conform. Thus, the decrypt( ) function may not be used to decrypt the secret key, $DK_{HE}$, from the $\{DK_{HE}\}_{SK'_{HE}}$ 602 message thereby further protecting the homomorphic cryptography secret key, $DK_{HE}$.

One issue with the hereinabove-described method of evaluating a cryptography operation under homomorphic encryption is verification that all rounds and steps individual rounds of the block cipher have been executed correctly. An attacker may seek to discern information by inserting faults into a calculation, so-called, fault attack. Introduction of such faults may cause the block cipher to not compute all rounds or steps of individual rounds. Thus, it is desirable to detect whether all rounds and steps have been executed.

Figure 7:
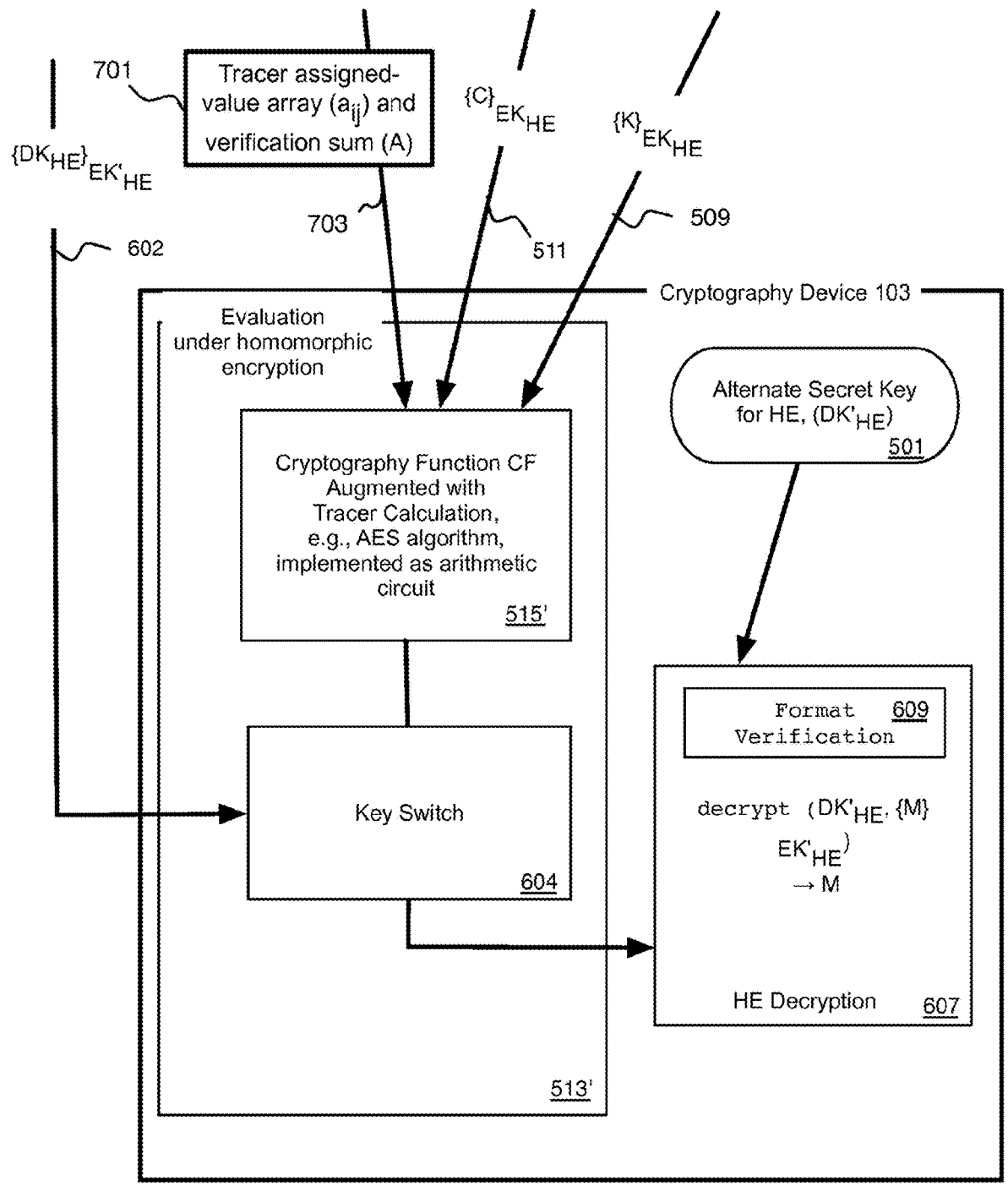
FIG. 7 is a schematic illustration providing an embodiment for the mechanisms of FIG. 5 and FIG. 6 in which the cryptographic device is provided a tracer vector and tracer verification sum to allow verification of the performance of a cryptographic operation protected using the HE white box mechanism.

In a further embodiment, tracer verification, illustrated in FIG. 7, a tracer is introduced to trace the execution of blocks and individual steps of blocks. A modified cryptography function CF 515', i.e., a modification to the cryptography function 515 of FIG. 5 and FIG. 6, includes a two-dimensional tracer array $t_{ij}$ wherein the first index i corresponds to a computation block of a cryptography function, e.g., a round of a multi-round block cipher, e.g., an AES round, and the second index j corresponds to a step executed in that computation block. A corresponding assigned value array, $\alpha_{ij}$, has pre-assigned values such that for each execution of the step i,j (step j of computation block i), the value $\alpha_{ij}$ may be assigned to $t_{ij}$, step 701.

In a preferred embodiment, $\alpha_{ij}$ is a superincreasing sequence, i.e., a sequence in which a given element is assigned a value that is greater than the sum of all the elements that precede it, e.g., (0 1 2 4 8 16). If $\alpha_{ij}$ is made a superincreasing series, the sum $\Sigma_i\Sigma_j\alpha_{ij}$ allows for the determination of whether any given step i,j has been executed.

A verification sum (A) is also pre-computed in step 701. The verification sum A is defined such that $A=\Sigma_i\Sigma_j a_{ij}$.

The assigned-value array $\alpha$ and the corresponding verification sum A are transmitted from the server to the cryptography device 103, Step 703.

Figure 8:
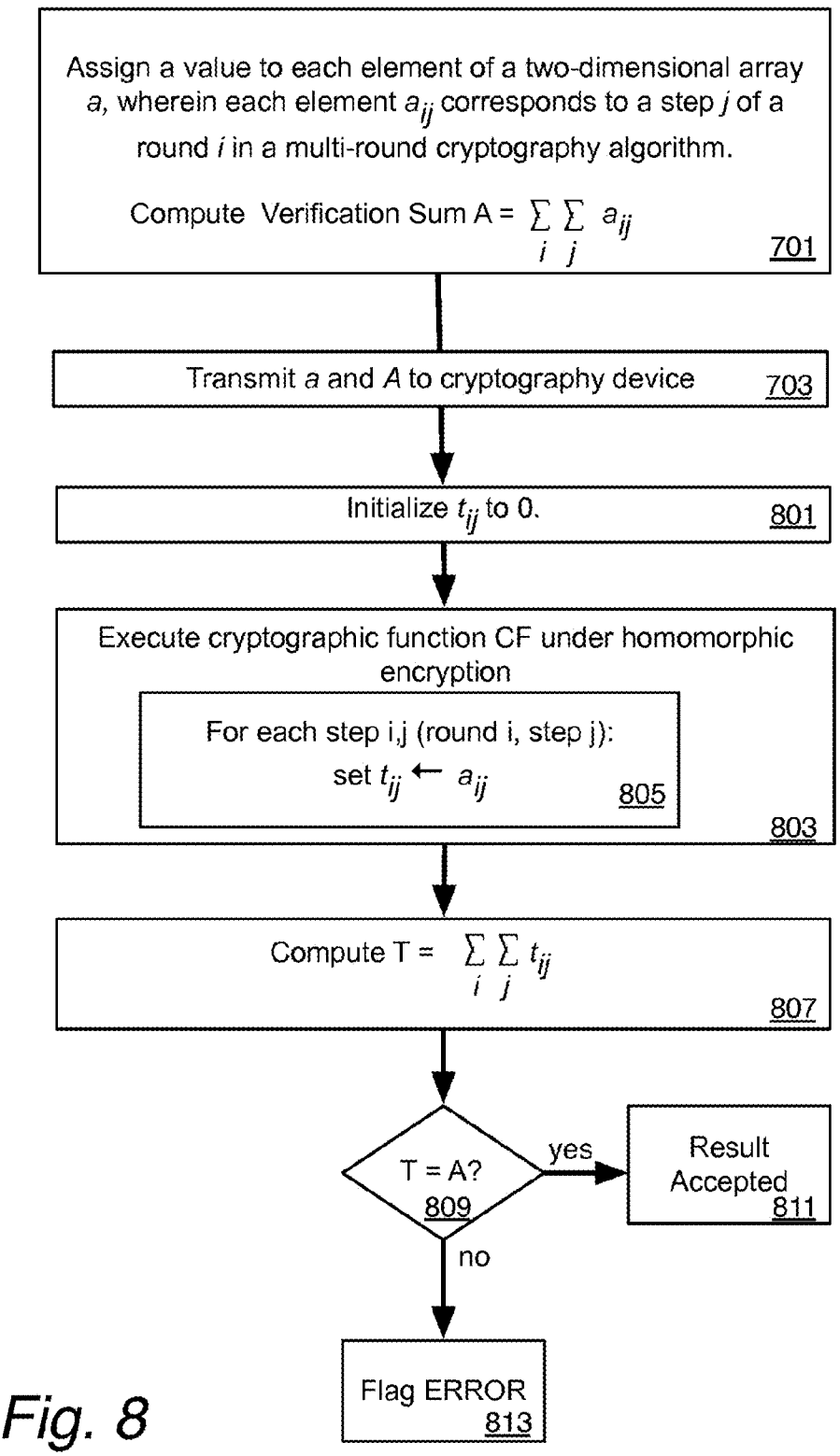
FIG. 8 is a schematic illustration providing an embodiment for the tracer verification of FIG. 7.

FIG. 8 is a flow chart illustrating the steps used in verifying the computation using a tracer. It should be noted here, that in preferred embodiments, described in conjunction with Figure Sand FIG. 10 the tracer computation is encrypted using a homomorphic encryption mechanism.

Steps 701 and 703 are as discussed above.

The array $t_{ij}$ is initialized such that all its elements have the value 0, step 801.

The cryptographic function CF is executed under homomorphic encryption as in FIG. 5 and FIG. 6, step 803, i.e., corresponding to step 515. For each step ij (computation block i, step j), the value $t_{ij}$ is set to the value $\alpha_{ij}$, step 805.

After the entire block cipher has been executed, the sum of all values $t_{ij}$ is computed, step 807, defining a quantity T, as follows:

$$T = \sum_i \sum_j t_{ij}$$

If all rounds and all steps of all rounds have been executed the verification sum A, received from the server as a verification sum, should equal the sum T of the tracer values. Accordingly, A and T are compared, step 809. If they are equal, the evaluation of the cryptography function may be accepted, step 811. Otherwise, an error is flagged, step 813.

In preferred embodiments, discussed below as Tracer Method 1 and Tracer Method 2 in conjunction with FIG. 9 and FIG. 10, respectively, one of the assigned-value array and the verification sum is encrypted and the other is not encrypted. In Tracer Method 1 (FIG. 9), the assigned-value array $a_{ij}$ is encrypted (referred to in its encrypted form as eα, having elements $e\alpha_{ij}$) and the verification sum (referred to as A) is not encrypted. In Tracer Method 2 (FIG. 10), the assigned-value array (α, having elements $\alpha_{ij}$) is not encrypted and, conversely, the verification sum is encrypted (referred to in its encrypted form as EA). In the respective cases, $e\alpha_{ij}$ is a ciphertext corresponding to $\alpha_{ij}$ and EA is a ciphertext corresponding to A.

Generally speaking, the concept of the tracer is to mix the homomorphic cryptography function CF (element 515') with the evolution of the tracer. At each step of each computation block of the cryptography function CF 515', the tracer is modified using a homomorphic operation.

Consider that the cryptography function CF 515 consists of n blocks, e.g., rounds in a block cipher, which are indexed by an index i, and each block i consists of k, steps, which are indexed by an index j, then, a cryptography function CF' 515', which is a modification of the cryptography function CF 515 of FIG. 5 and FIG. 6, includes a two-dimensional tracer array, which is either encrypted or not encrypted and conversely referred to as either $et_{ij}$ or $t_{ij}$, depending on whether Tracer Method 1 or Tracer Method 2 is used, wherein the first index i corresponds to a computation block (e.g., a round of a multi-round block cipher, e.g., an AES round), and the second index j corresponds to a step executed in that computation block. The corresponding assigned-value array, $e\alpha_{ij}$ or $\alpha_{ij}$, has pre-assigned values such that for each execution of step i,j (i.e., step j of block i), the value $e\alpha_{ij}$ is assigned to $et_{ij}$ (Method 1) or the value $\alpha_{ij}$ is assigned to $t_{ij}$ (Method 2).

Figure 9:
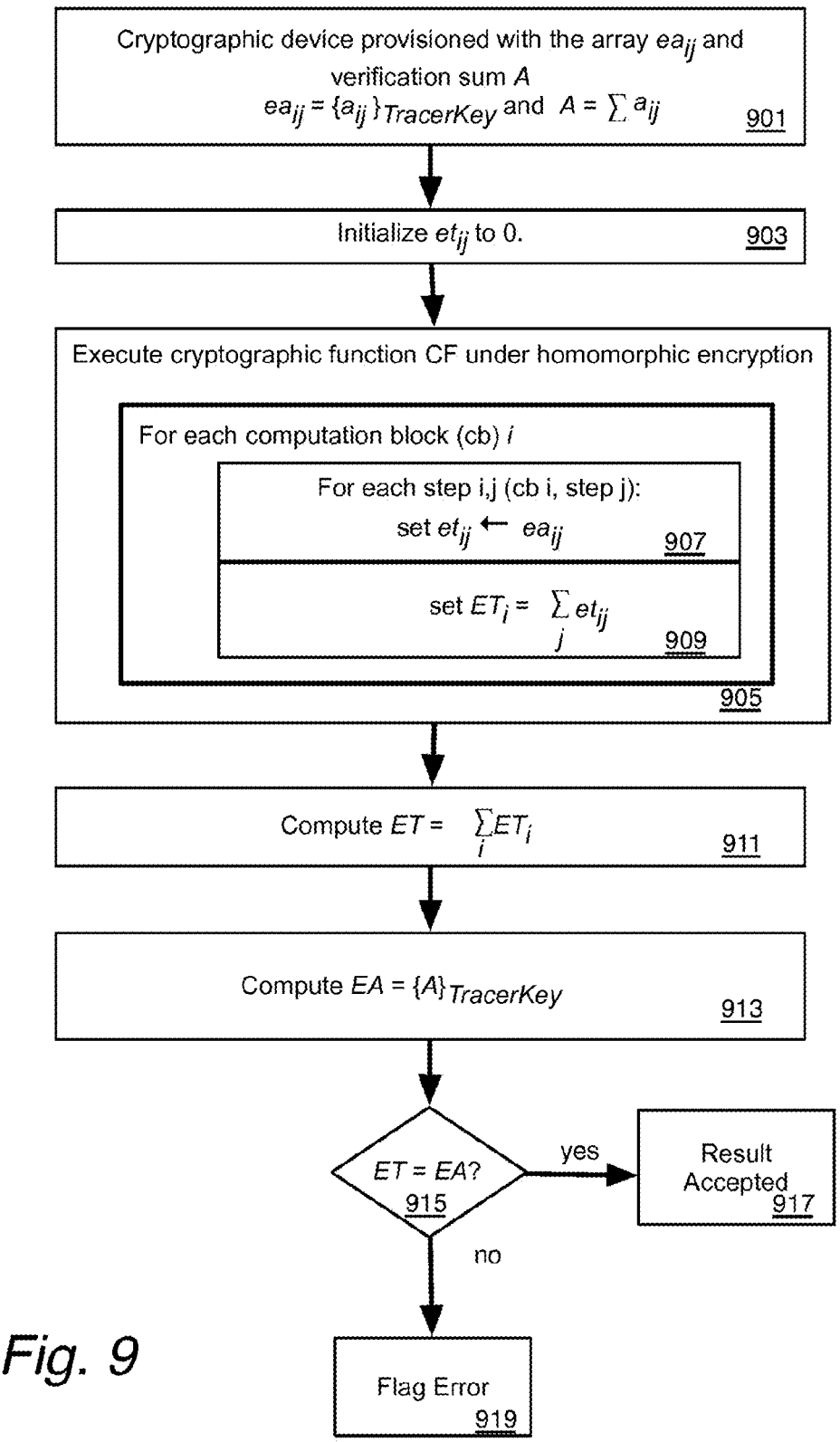
FIG. 9 is a schematic illustration providing a first embodiment of the tracer mechanism of FIG. 7 and FIG. 8, in which the tracer mechanism is encrypted.

In the embodiment referred to herein as Method 1, illustrated in the flowchart of FIG. 9 the server 113 generates the assigned-value array $\alpha_{ij}$ corresponding to each step j of each round i and then computes an encrypted tracer vector $e\alpha_{ij}$ corresponding to each step j of each round i. In other words, the tracer vector ea contains $k_1 + k_2 + \ldots + k_n$ elements, where $k_i$ is the number of steps in round i. The values $e\alpha_{ij}$ are ciphertext values corresponding to the array elements $\alpha_{ij}$:

$$ea_{ij} = \{a_{ij}\}_{TracerKey}$$

for i=1 to n and j=1 to $k_n$ and TracerKey is a public key (or a shared secret key) for the encryption.

Furthermore, in the preliminary step 701, the server 113 computes the sum, A, of the unencrypted tracer values, $\alpha_{ij}$:

$$A = \Sigma a_{ij}$$

The values $e\alpha_{ij}$ and A are provided to the cryptography device 103, step 703 (corresponding to step 901 of FIG. 9.

Thus, in a preliminary step, the encrypted assigned-value array eα and the plaintext verification sum A, are generated and provided to the block cipher 515' of the cryptography device 103, step 901, corresponding to the initial steps 701 and 703 of FIG. 7.

Thus, after step 901, for Method 1, the cryptography device 113 has been provisioned with:

$\{K\}_{EK_{HE}}$
$\{C\}_{EK_{HE}}$
$DK'_{HE}$
$\{DK_{HE}\}_{EK_{HE}}$
$e\alpha_{ij} = \{\alpha_{ij}\}_{TracerKey}$ for i=1 to n and j=1 to $k_n$
where the TracerKey depends on the encryption method used
$A = \Sigma \alpha_{ij}$ FIG. 9 is a flowchart illustrating Tracer Method 1 for encrypting the tracer verification.

As noted above, the cryptographic device 103 is provisioned with the array $e\alpha_{ij}$ and the verification sum A, step 901 (corresponding the steps 701 and 703 of FIG. 7):

$$A = \sum_i \sum_j a_{i,j}$$

The array $et_{ij}$ is initialized such that all the elements thereof have the value 0, step 903.

The cryptography function CF is executed under homomorphic encryption as in FIG. 5 and FIG. 6, step 905, corresponding to step 515' of FIG. 7. Let's consider the cryptography function CF as being composed of a number of computation blocks (CB) and each computation block composed of a number of steps. The computation blocks may, for example, correspond to rounds of a block cipher. For each computation block i, for each step j of computation block i (round i, step j), the value $et_{ij}$ is set to the value $e\alpha_{ij}$, step 907:

$$et_{ij} = e\alpha_{ij}$$

After all steps of a computation block i have been computed, a tracer sum $ET_i$ is computed for that round, step 909:

$$ET_i = \sum_j et_{i,j}$$

After the entire cryptography function CF has been executed, i.e., at the conclusion of the n rounds of the cryptography function CF, the cryptographic device 113 computes a sum of all values for $ET_i$, step 911, defining a new quantity ET, as follows:

$$ET = \sum_i ET_i$$

If all rounds and all steps of all computation blocks have been executed A should equal T or, the corresponding encrypted values, EA should equal ET. Therefore, EA is computed from A so that EA can later be compared to ET, step 913:

$$EA = \{A\}_{TracerKey}$$

For EA and ET to be equal, the encryption must be homomorphic. As discussed in greater detail below, that may require that the key used to encrypt the value A be derived from the computation of the value ET and the key used to encrypt the elements $\alpha_{ij}$. This derivation is described in greater detail below.

Next, EA and ET are compared, step 915.

If the EA and ET values are equal, the tracer computation has verified that all steps of all computation blocks of the cryptographic function have been performed correctly; the cryptographic result may be accepted, Step 917.

Otherwise, the EA and ET values not being equal is an indication of an error condition in the cryptographic function. In that case, an error is flagged, step 919.

Figure 10:
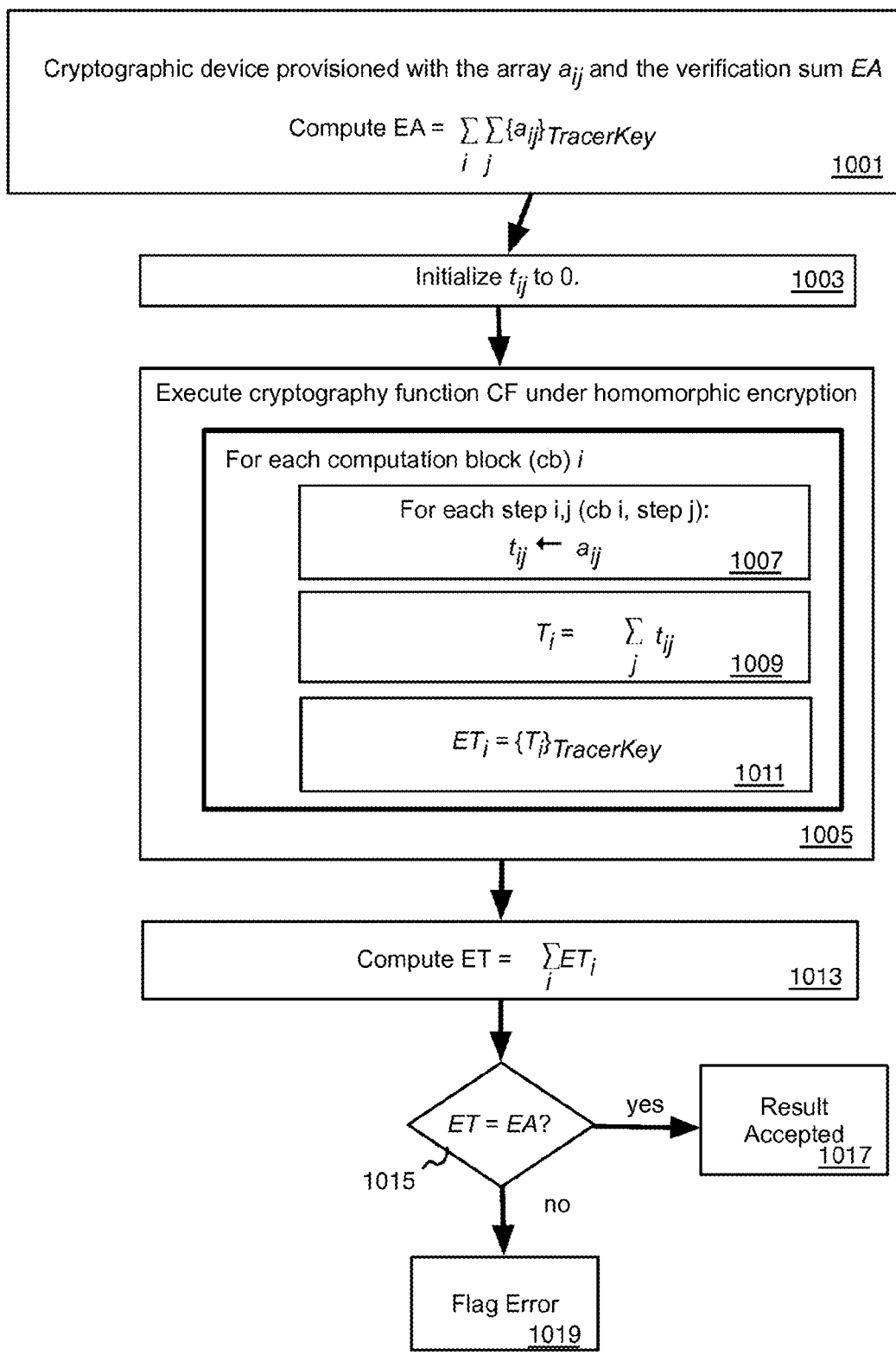
FIG. 10 is a schematic illustration providing a second embodiment for the tracer mechanism of FIG. 7 and FIG. 8, in which the tracer mechanism is encrypted.

In an alternative embodiment, referred to herein as Method 2, illustrated in FIG. 10, the server generates and provides the cryptography device 103 with an assigned-value array $\alpha_{ij}$ as well as with sum EA of the assigned-value array $\alpha_{ij}$, values encrypted using the TracerKey, step 1001; i.e., the converse of Method 1:

$$EA = \sum_i \sum_j \{a_{ij}\}_{TracerKey}$$

Thus, after step 1001 (corresponding to Steps 701 and 703), the cryptography device 113 has been provisioned with:

$\{K\}_{EK_{HE}}$
$\{C\}_{EK_{HE}}$
$DK'_{HE}$
$\{DK_{HE}\}_{EK_{HE}}$
$\alpha_{ij}$ for i=1 to n and j=1 to $k_n$
$EA = \Sigma\{\alpha_{ij}\}_{TracerKey}$ On the cryptography device 103, a tracer array $t_{ij}$ is initialized by setting each value to 0, step 1003, where i ranges over the number of computation blocks and for each value i, j ranges over the steps that make up the computation block i.

The cryptography function is executed under homomorphic encryption, step 1005.

Step 1007, for each computation block i, at each step j for computation block i, the cryptography device 103 assigns:

$t_{ij}=a_{ij}$

Step 1009, at the conclusion of each computation block i, the cryptography device 103 computes a tracer sum for the computation block i:

$$T_i = \sum_{j=1}^{k_i} t_{ij}$$

and, step 1011, performs the homomorphic encryption operation on the tracer sum $T_i$:

$ET_i = \{T_i\}_{TracerKey}$

In a subsequent step (step 1013), $ET_i$ is used to produce a sum of the tracer sums for all the computation blocks i, ET, which is compared to the value EA provisioned by the server in step 1001. To make that comparison possible, the homomorphic property must hold. That may require that the TracerKey used to compute ET, be derived from the keys used to compute the encryption of each $\alpha_{ij}$ value. This is discussed in greater detail below.

After computation of n computation block, n FHE ciphertexts $ET_1, \ldots, ET_n$ have been computed. The sum of these is computed, step 1013:

$$ET = \sum_{i=1}^{n} ET_i$$

The value ET is tested against the supplied value against the provisioned value EA, step 1015.

If the values ET and EA are equal, that verifies correct computation of all steps of the cryptographic operation and the result is accepted, step 1017. Conversely, if they are not equal, a condition of improper calculation, for example, due to tampering or some form of side-channel attack, is indicated and an error condition is flagged, step 1019.

The tracer calculations of FIG. 9 and FIG. 10 and described hereinabove as "Method 1" and "Method 2", respectively, are, for example, deployed prior to the key-switch operation 604 of FIG. 7 If cryptographic operation 515' (FIG. 7) is not verified as correct by the tracer computations, the key-switch operation 604 and subsequent steps are not performed or similar operations with wrong values are performed. If, however, the tracer verification is correct, the key-switching operation 604 is performed.

Above, the tracer methods of FIG. 9 and FIG. 10 are described without specifying the encryption method used; any encryption method with the requisite homomorphic properties may be used. As noted, in both Method 1 and Method 2, a summation of the assigned value array $\alpha_{ij}$ is performed by the server and the corresponding summation of the tracer array $t_{ij}$ is performed on the cryptography device. However, if the summation is performed on plaintext quantities on the server, the corresponding summation is performed using equivalent ciphertexts on the cryptography device, or vice versa. To ensure that the homomorphic property to hold, the requisite encryption keys may have to be generated and updated on the cryptographic device.

The encryption may be a fully homomorphic encryption or a partially homomorphic encryption. An example of the former is FHE scheme according to DGHV (M. van Dijk, C. Gentry, S. Halevi, and V. Vaikuntanathan, Fully homomorphic encryption over the integers, Advances in cryptology—EUROCRYPT 2010, Lecture Notes in Comput. Sci., vol. 6110, Springer, Berlin, 2010, pp. 24-43., hereinafter "DGHV"). An example of the latter is ElGamal.

In DGHV, the same key is used to encrypt and to decrypt, i.e., $EK_{Tracer}=DK_{Tracer}$, denoted here as $P_{Tracer}$. For the encryption, two random values, r' and q, and the encryption of a value x (having k bits), denoted as ex, is computed as:

$ex = \{x\}_{P_{Tracer},r'} = P_{Tracer}q + 2^k r' + x$ where, r=(r', q)

As these are FHE ciphertexts, if two ciphertext values, $ex_1$ and $ex_2$, are added, the following holds:

$ex_1 = P_{Tracer}q_1 + 2^k(r'_1) + x_1$ $ex_2 = P_{Tracer}q_2 + 2^k(r'_2) + x_2$ $ex_1 + ex_2 = P_{Tracer}(q_1+q_2) + 2^k(r'_1+r'_2) + (x_1+x_2)$ thus, the r associated with the sum $ex_1+ex_2$ is:

$r = (q_1+q_2, r'_1+r'_2) = f(r_1, r_2)$

Similarly, if two ciphertext values, $ex_1$ and $ex_2$, are multiplied, the product is:

$$ex_1 * ex_2 = P_{Tracer}^2 * q_1 q_2 + P_{Tracer} * (2^k(q_1 r'_2 + q_2 r'_1) + q_1 x_2 + q_2 x_1) + 2^k(2^k r'_1 r'_2 + r'_1 x_2 + r'_2 x_1) + x_1 x_2$$

with the associated r value $$r = (q_1 q_2 p + 2^k (q_1 r'_2 + q_2 r'_1) + q_1 x_2 + q_2 x_1, 2^k r'_1 r'_2 + r'_1 x_2 + r'_2 x_1) = f(r_1, r_2, x_1 x_2)$$

i.e., r is a function depending on the random values used and the messages being encrypted.

From which it follows that $$\text{encrypt}((P_{Tracer}, r), x_1 * x_2) = ex_1 * ex_2$$

In a second example, the ElGamal homomorphic encryption mechanism is used.

In ElGamal, the secret key, $DK_{Tracer}$, and corresponding public key, $EK_{Tracer}$, are not the same. However, they depend on each other through a random value r, as follows:

$$PK_{Tracer} = g^{DK_{Tracer}}$$

An encryption of a value x:

$$ex = \{x\}_{EK_{Tracer}, r} = (g^r, EK_{Tracer}^r)$$

Elgamal is homomorphic over multiplication, as follows:

$$y_1 * y_2 = ex_1 * ex_2 = (g^{r_1 + r_2}, (x_1 * x_2) * EK_{Tracer}^{r_1 + r_2})$$

In other words, the product $y_1 * y_2 = ex_1 * ex_2$ is an ElGamal encryption of the product $x_1 * x_2$ with a value $r = r_1 + r_2 = f(r_1 + r_2)$.

From which it follows that:

$$\text{encrypt}((EK_{Tracer}, r), x_1 * x_2) = ex_1 * ex_2$$

Note, the homomorphic encryption operation requires the random value $r_i$, which must be generated in a deterministic way such that $r_i$ is related to $r_{ij}$ and possibly to $\alpha_{ij}$, depending on the homomorphic algorithm used.

If the encryption is DGHV, each value $e\alpha_{ij}$ has been encrypted as:

$$ea_{ij} = \{a_{ij}\}_{P_{Tracer}, r} = P_{Tracer} q + 2^k r' + a_{ij}$$

where, $r = (r', q)$

Thus, since ET is a sum of all the $et_{ij}$ values, the value r, designated R, corresponding to ET is a function of all the r values corresponding the $et_{ij}$. Specifically, R corresponding to ET:

$$R = f(r_{11}, \ldots, r_{ij}) = \left( \sum_i \sum_j q_{ij}, \sum_i \sum_j r_{ij} \right)$$

And, EA is:

$$EA = \{A\}_{P_{Tracer}, R}$$

In the general case, ElGamal is not homomorphic over addition. However, ElGamal is homomorphic over multiplication. Thus, for an embodiment where ElGamal is used as the cryptography system for the tracer, tracer values are multiplied rather than added to produce the check values.

The value R can be precomputed and stored on the cryptography device 103. To enhance the security of the mechanism, R may be stored in an obfuscated manner. For example, R may be decomposed into R' and R" such that R=R' XOR R". The values R' and R" are stored in lieu of R and whenever R is required in a computation it is obtained by R=R' XOR R".

In both the DGHV and ElGamal cryptosystems, the ciphertext function includes random numbers. The encrypted tracer methods described hereinabove may be viewed as sequential encryption where each sequence member corresponds to a particular computation block (indexed i) and a computation step (indexed j) of such a computation block. Each such encryption has its own unique random number associated therewith, i.e., a sequence of random numbers. However, so that the encryption on the server and on the cryptography device correspond to one another, the random number sequence must correspond. Accordingly, a deterministic random sequence produced by a deterministic random generator is used on both the server and on the cryptography device.

Figure 11:
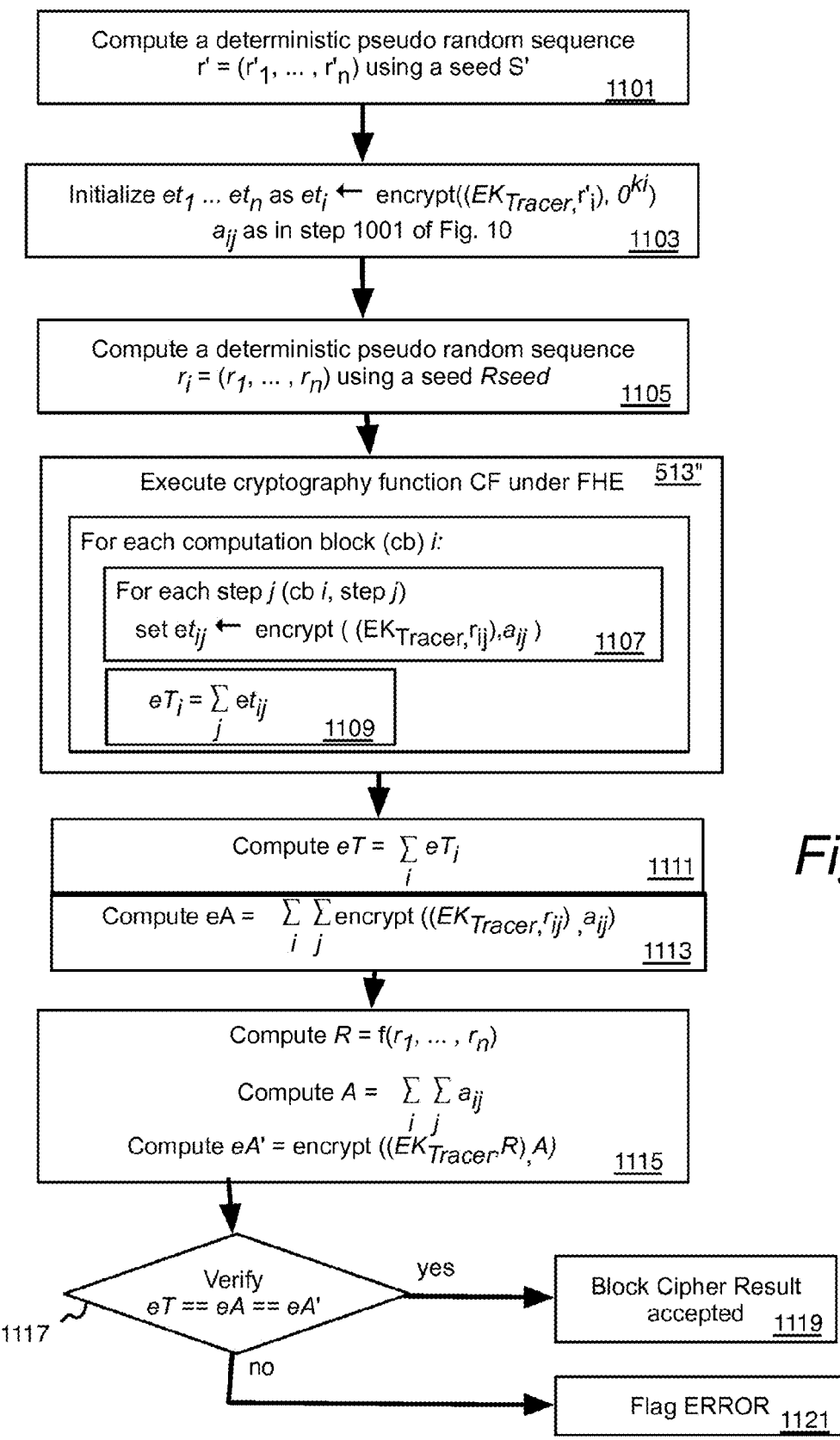
FIG. 11 is a flow-diagram illustrating an embodiment in which a secure deterministic random sequence is applied to the second embodiment for applying a tracer as illustrated in FIG. 10.

FIG. 11 is a flow-diagram illustrating an embodiment in which a deterministic random sequence is applied to Method 2, illustrated in FIG. 10.

In a first step, a first deterministic pseudo-random sequence $r' = r'_1, \ldots, r'_n$ is determined using a seed S', step 1101, for example, using a Deterministic Random Number Generator, DRNG. One mechanism for securely establishing a first deterministic pseudo-random sequence, which may be used here, is described in the patent application Cryptography Device Having Secure Provision of Random Number Sequences of the same inventors incorporated herein by reference.

As discussed above, a cryptographic function contains a number of computation blocks m, e.g., rounds of a block cipher, and each computation block contains a number of steps, $k_i$, where i is the index for a particular computation block. Thus, the total number of computation steps is:

$$K = \sum_i k_i$$

Therefore, a deterministic random sequence r' is determined for K elements.

As discussed above, an encrypted tracer array $et_{ij}$, which is an encryption of an assigned value $\alpha_{ij}$ where the encryption uses a corresponding random value $r_{ij}$. While these may be indexed using a two-dimensional index (computation block i, step j), they may also be viewed as vectors having K elements and indexed using just one index in such a vector.

Accordingly, corresponding to K ($K = \sum_i^m k_i$) computation steps, initialize, step 1103, a vector $et_i$ (i.e., $(et_1, \ldots, et_a)$), such that $$et_i = \text{encrypt}((EK_{Tracer}, r'_i), 0^{k_i})$$

where, $k_i$ = number of steps for the computation block i thereby establishing $$et_1, \ldots, et_n \leftarrow (\text{encrypt}((EK_{Tracer}, r'_i), 0^{k_i}), \ldots, \text{encrypt}((EK_{Tracer}, r'_i), 0^{k_n}))$$

Thus, the array $et_i$ is initialized with random numbers.

Further, $\alpha_a$ is initialized as set forth in conjunction with FIG. 7, step 701, FIG. 8, step 701, and FIG. 10, step 1001 as discussed above.

A second random sequence $r_i = (r_1, \ldots, r_n)$ is determined using a seed Rseed, step 1105; the random sequence $r_i$ may be generated using the secure random sequence generator of the patent application "Cryptography Device Having Secure Provision of Random Number Sequences" of the same inventors.

The cryptography function CF is executed under homomorphic encryption step 513'', i.e., the cryptographic function has been modified into an arithmetic circuit, which may be executed using homomorphically encrypted values and satisfying the homomorphic property. For each computation block i, for each step j of computation block i, $et_{ij}$ is set as follows, step 1107:

$$et_{ij} = \text{encrypt}((EK_{Tracer}, r_{ij}), a_{ij})$$

where, $r_{ij}$ is a random value in the random sequence $r_i$. Alternatively, the random value for the encryption may be a function of $r_{ij}$ and the corresponding value $\alpha_{ij}$, i.e., $r = f(r_{ij}, a_{ij})$, in which case:

$$et_{ij} = \text{encrypt}((EK_{Tracer}, r), a_{ij})$$

where, $$r = f(r_{ij}, a_{ij})$$

The encrypt function may be either based on a fully homomorphic scheme, e.g., DGHV, or a somewhat homomorphic scheme, e.g., El Gamal, which is homomorphic over multiplication.

After all steps of a computation block i have been executed, a sum of all the $et_{ij}$ values for that computation block are summed and recorded as $eT_i$, step 1109:

$$eT_i = \sum_j et_{ij}$$

After the cryptography function evaluation of 513'', the $eT_i$ values are summed and recorded as eT, step 1111:

$$eT = \sum_i eT_i$$

eT (the sum of the encrypted tracer values for all computation blocks and steps) is compared to a sum of encryptions of the values that are normally assigned to the tracer, namely, $\alpha_{ij}$. These are also encrypted using $EK_{Tracer}, r_{ij}$ thereby having the same value as the corresponding tracer value, step 1113:

$$eA = \sum_i \sum_j \text{encrypt}((EK_{Tracer}, r_{ij}), a_{ij})$$

Optionally, a second verification value, eA', may also be computed directly from the $\alpha_{ij}$ values, step 1115. First a value R (referred to herein as the summation random value), which is used to encrypt the sum of $\alpha_{ij}$ values, is computed as a function of the sequence $r_i = (r_1, \ldots, r_n)$:

$$R = f(r_1, \ldots, r_n)$$

The function $f$ for determining the value of R depends on the relationship of the operations performed and the encryption scheme used. The encrypt function may be either based on a fully homomorphic scheme, e.g., DGHV, or a somewhat homomorphic scheme, e.g., El Gamal, which is homomorphic over multiplication. For example, as noted above, for DHGV, the sum ex of two ciphertexts $ex_1$ and $ex_2$, which are encrypted using keys $(q_1, r'_1)$ and $(q_2, r'_2)$, respectively, is encrypted with the key $(q_1+q_2, r'_1+r'_2)$. Thus, in the simple case, if eA is merely the sum of two values $\alpha_{i1}$ and $\alpha_{i2}$, the value R would be $r'_{i1}+r'_{i2}$. Generally, R is the sum of all rij values corresponding to the values $\alpha_{ij}$ added to form eA.

Because, if the computation has performed all steps, the second verification value, eA', is supposed to correspond to eT, which was computed in step 1107 and 1109 as a sum of the encrypted $\alpha_{ij}$ values, the function $R = f(r_1, \ldots, r_n)$ follows the same steps such that:

$$\text{encrypt}((EK_{Tracer}, R), A) = \Sigma \text{encrypt}((EK_{Tracer}, r_i), a_{ij})$$

A quantity A representing the sum of all $\alpha_{ij}$ values is computed:

$$A = \sum_i \sum_j a_{ij}$$

This value is encrypted using $(EK_{Tracer}, R)$ to produce the value eA':

$$eA' = \text{encrypt}((EK_{Tracer}, R), A)$$

Correct execution of the cryptography function CF should have eT, eA, and eA' equal. These equalities are verified, step 1117. If the verification holds, the block cipher evaluation result is accepted, step 1119, otherwise, and an error condition may be raised, step 1121.

There are several possible alternative embodiments, for each of the mechanisms described above. For example, the mechanisms described herein may be performed entirely under FHE. However, FHE tends to be very computationally expensive. Therefore, as described below, for example, some calculations may be performed under a less stringent homomorphic requirement, i.e., a somewhat homomorphic encryption.

In a first alternative, Option 1, the public key for the encryption of the tracer, $EK_{Tracer}$, is the same as the public key for the HE, $EK_{FHE}$, under which the block cipher is evaluated:

$$EK_{Tracer} = EK_{FHE}$$

An advantage of this approach is that with the use of the same key for both tracer computation and cryptography function evaluation, it is difficult for an attacker to discern which calculation is being performed by the cryptography device 103. However, encryption with FHE tends to be very complex and there is no need for FHE for the tracer computation as only additive homomorphic properties are relied on.

A second alternative, Option 2, a specific key is used to encrypt the tracer, i.e., $$EK_{Tracer} \neq EK_{FHE}$$

An advantage is that the secret key, $DK_{Tracer}$, corresponding to the public key, $EK_{rand}$, may be provided in some context, e.g., to the decryption server 117, to allow for determination specific block cipher steps with errors in the tracer.

Option 2 has three alternatives:
Option 2.1: the encryption scheme is FHE
An advantage of having the encryption scheme as FHE is that it makes it more difficult for an attacker to distinguish between whether tracer computation is being performed or whether cryptography function evaluation is being performed.

However, as noted above, FHE computations are very complex and computationally costly, and FHE is unnecessary for the underlying computation.

Option 2.2: the encryption scheme is HE (homomorphic encryption) over one operation. An example is ElGamal encryption, which is homomorphic over multiplication.

An advantage is that HE is much more computationally efficient than FHE. However, use of HE for tracer encryption renders the calculations easier to distinguish by an attacker.

Option 2.3: use a function F that is not homomorphic rather than actual encryption, e.g., simply masking the random with the tracer. An advantage of this approach is that it is yet more efficient. However, not using homomorphic encryption will not allow for the three-way comparison of values in FIG. 11 step 1117 as the calculations in step 1115 would not produce a correct value unless homomorphic encryption is used. Therefore, this approach is least secure.

Figure 12:
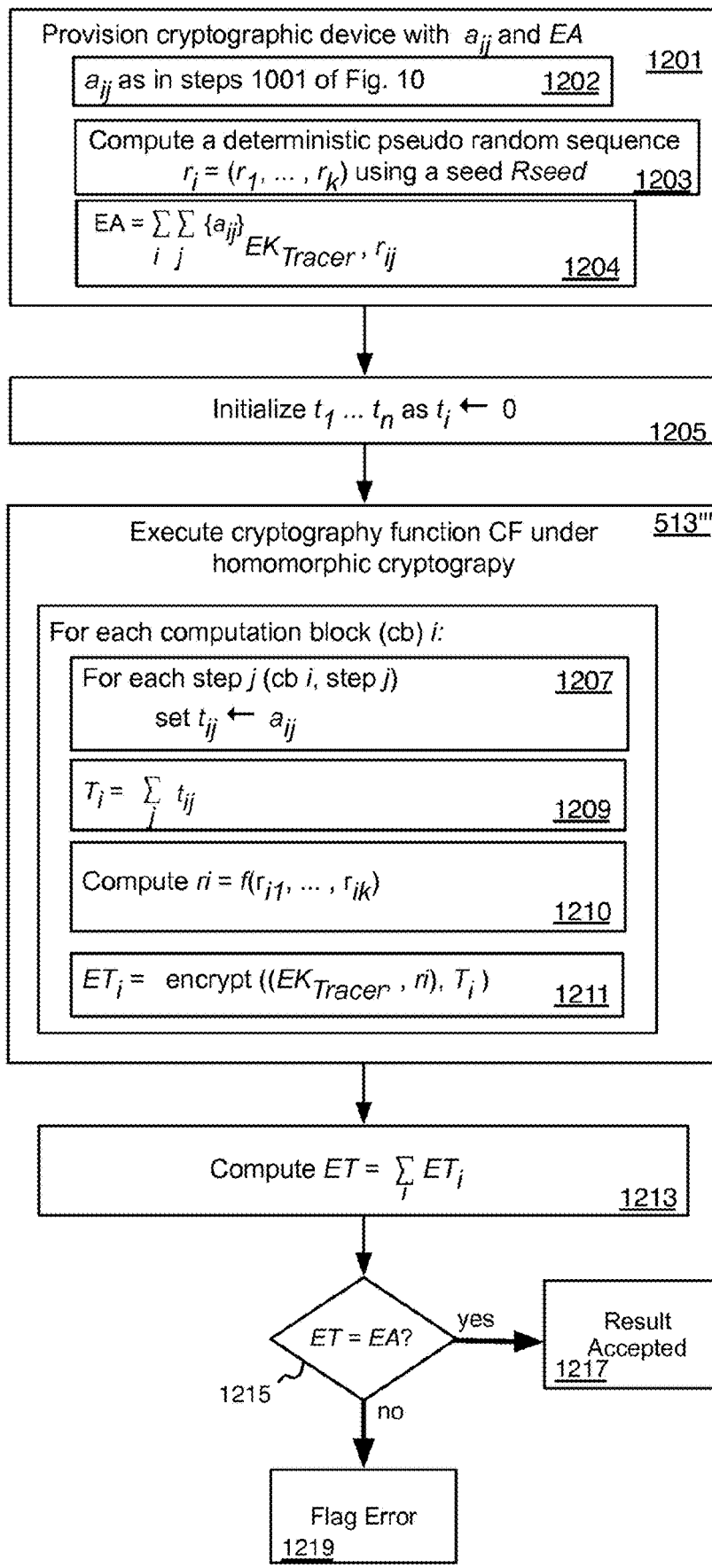
FIG. 12 provides additional detail for the mechanism for using an encrypted tracer as discussed hereinabove in conjunction with FIG. 10 using a secure deterministic random sequence.

FIG. 12 is a flow-diagram illustrating an alternative embodiment for the application of a deterministic random sequence to Method 2, which is illustrated in FIG. 10.

As with the method of FIG. 10, the cryptography device 103 is provisioned with $a_{ij}$ and EA, step 1201. $\alpha_{ij}$ is set as in step 1001 of FIG. 10, step 1202. However, EA is computed as a sum of encrypted $\alpha_{ij}$ values. To do so, a deterministic random sequence $r_i=(r_1, \ldots, r_n)$ is determined using a seed Rseed, step 1203; the random sequence r, may be generated using the secure random sequence generator of the patent application, entitled "Cryptography Device Having Secure Provision of Random Number Sequences of the same inventors,". As above, r, is a sequence of n random values and may also be indexed using computation block index, i, and step index, j.

The value EA is computed as a sum of the $\alpha_{ij}$ values encrypted using the random sequence $r_i$, step 1204:

$$EA = \sum_i \sum_j \{a_{ij}\}_{EK_{Tracer}, r_{ij}}$$

On the cryptography device 103, a tracer array $t_{ij}$ having n members is initialized by setting each member of the array t to 0, step 1205, where i ranges over the number of computation blocks and for each value i, j ranges over the steps that make up the computation block i. For the initialization, it is sufficient to simply sequentially initialize n elements of the array t.

The cryptography function CF 515 is executed under homomorphic cryptography, i.e., the block cipher has been modified into an arithmetic circuit, which may be executed using FHE encrypted values and satisfying being fully homomorphic, step 513'''. For each computation block i, for each step j of computation block i, $t_{ij}$ is set to $\alpha_{ij}$, step 1207.

For each computation block, the $t_{ij}$ values for that computation block are summed to produce a value $T_i$, step 1209.

For each computation block i, a value $ES_i$, which is an encryption of the sum $S_i$, is computed, step 1211. However, a component of the encryption key is a value ri, which is a function of the encryption keys used to encrypt the various $\alpha_{ij}$ values for corresponding to computation block i. Thus, first the value ri, to be used in the encryption of $T_i$, corresponding to the $r_{ij}$ values used for encrypting the $\alpha_{ij}$ values for each block i in step 1204 is computed, step 1210:

$$ri=f(r_{i1}, \ldots, r_{ik})$$

where k is the number of steps for computation block i. As discussed hereinabove in conjunction with FIG. 11, specifically the computation of the value R, for an encryption to have the homomorphic property, the key may need to be recomputed.

For each computation block i, a value $ES_i$ is computed as an encryption of the value Si using the value ri, step 1211:

$$ET_i=\{T_i\}_{EK_{Tracer}, ri}$$

At the conclusion of the execution of the computation function CF under FHE 513''', the sum of the encrypted sums $ET_i$ is computed, step 1213, producing a value ET:

$$ET = \sum_i ET_i$$

If ET equals the value EA provided in step 1204, the tracer computation has been verified. Accordingly, ET and EA are compared, step 1215. If the tracer computation has been confirmed, the result of the computation is accepted, step 1217. Otherwise, an error is flagged, step 1219.

Figure 13:
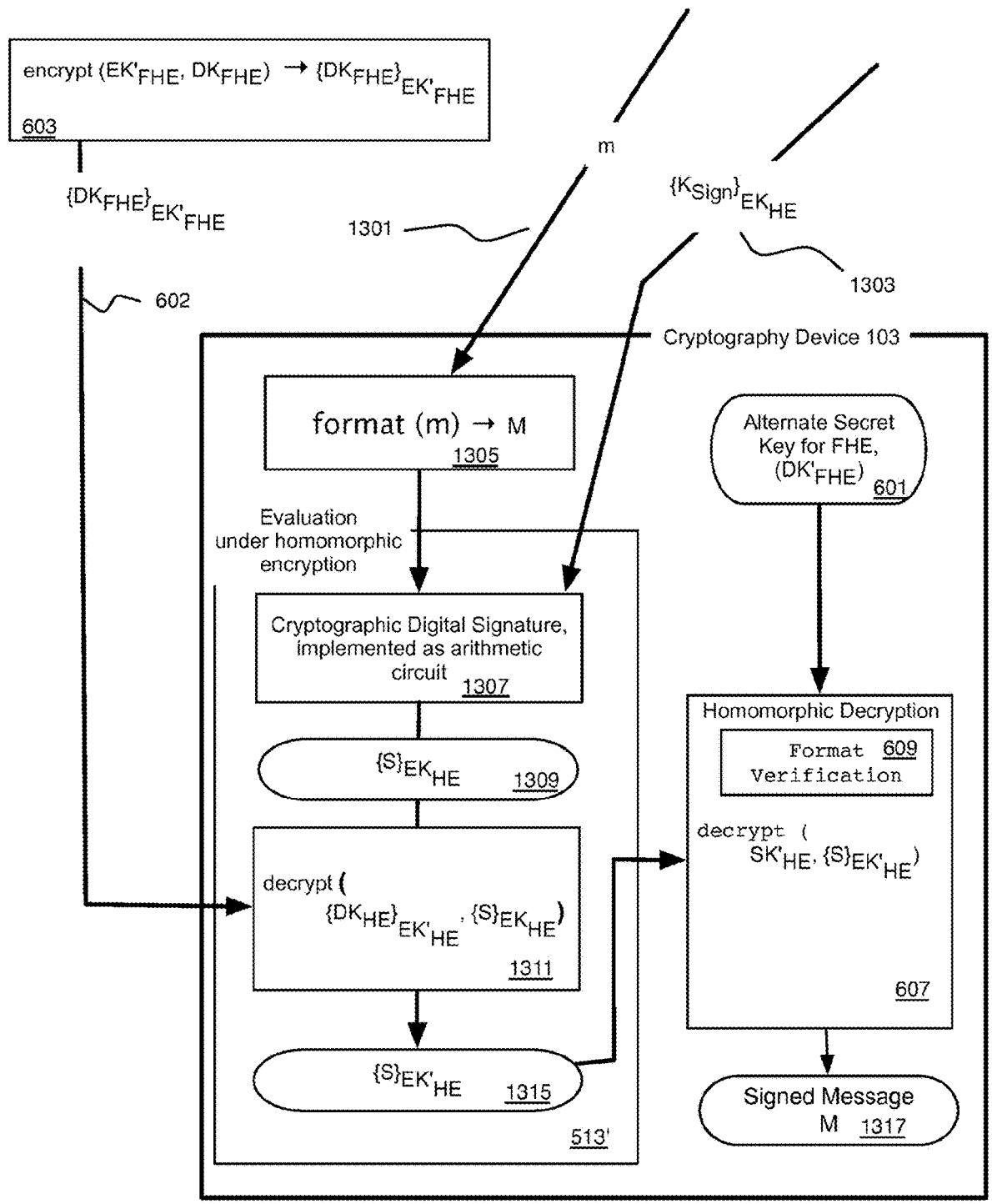
FIG. 13 is a schematic illustration of a white-box HE implementation of cryptographic digital signature.

In an alternative use, illustrated in FIG. 13, the mechanisms of FIG. 5 through FIG. 9 provide a white-box cryptographic digital signature. A message m is received by the cryptography device 103 from the service provider 113, Step 1301. Furthermore, the cryptography device 103 also receives an encrypted signing key, $\{K_{sign}\}_{EK_{HE}}$, used to sign a message, step 1303. As with the encryption key for cryptographic function CF described hereinabove, the key $K_{sign}$ is homomorphically encrypted, i.e., $\{K_{sign}\}_{EK_{HE}}$. The encrypted signing key $\{K_{sign}\}_{EK_{HE}}$ is provided to the cryptography device 103, step 1303.

The message m is formatted to a specified format, e.g., hashed and padded, step 1305. The resulting quantity is a formatted message M.

The formatted message M is combined with an homomorphic ciphertext thereby providing a digital signature of the message, Step 1307. The homomorphic ciphertext portion is produced using the encrypted signing key, $\{K_{sign}\}_{EK_{HE}}$. Thus, the result 1309 is also encrypted, $\{S\}_{EK_{HE}}$.

As with the cryptography examples described hereinabove, a key change operation may be performed, Step 1311, producing a quantity $\{S\}_{EK_{HE}}$ 1315.

Decryption, to arrive at the signed message, proceeds as described hereinabove, thereby producing a signed output message M 1317, which, due to the homomorphic property, is the same value as m signed by $K_{sign}$. However, by performing the calculation under homomorphic encryption, the key $K_{sign}$ is not used in plaintext. The tracer mechanisms described hereinabove may be employed to secure the calculation.

From the foregoing, the improvement of the security of a cryptography device operating in a white-box environment and storing secret material, for example, the secret key, K, is apparent. This improvement to cryptography devices is provided by enabling the cryptography devices to use fully homomorphic encryption to perform cryptographic calculations, such as block ciphers, in a manner that does not use the key of the block cipher in a plaintext format. Further, the calculations, while hidden using homomorphic encryption, may be verified using a tracer, which also may be encrypted.

Although specific embodiments of the invention have been described and illustrated, the invention is not to be limited to the specific forms or arrangements of parts so described and illustrated. The invention is limited only by the claims.

The invention claimed is:

1. A method for securing a white box cryptographic function computation on a cryptographic device such that a cryptography key K, used to encrypt a plaintext into a ciphertext, is not used in a plaintext form, comprising:

receiving a first message ($\{C\}_{PK_{HE}}$ or m);

receiving a message ($\{K\}_{EK_{HE}}$) containing a cryptography key (K) encrypted using a first homomorphic encryption key ($EK_{HE}$) using a homomorphic encryption scheme, the homomorphic encryption key ($EK_{HE}$) having a corresponding homomorphic decryption key ($DK_{HE}$);

performing a cryptographic operation on the first message using the encrypted cryptography key ($\{K\}_{EK_{HE}}$) thereby producing a cryptography function output ($\{M\}_{EK_{HE}}$ or $\{S\}_{EK_{HE}}$)) encrypted using the first homomorphic encryption key ($EK_{HE}$);

associating each step j of each computation block i of the cryptographic operation with a verification value ($e\alpha_{ij}$, $\alpha_{ij}$) and verification sum (A,EA) wherein one of the verification sum (EA) is an encryption of the sum of the verification values ($\alpha_{ij}$) or the verification sum (A) is the sum of plaintext values ($\alpha_{ij}$) corresponding to the verification values ($e\alpha_{ij}$);

using homomorphic encryption, encrypting one of the verification value and the verification sum and not encrypting the other of the verification value and the verification sum; and for each step j of each round i of the cryptographic function assigning a tracer value ($t_{ij}$,$et_{ij}$) with the verification value corresponding to that step i,j;

at the conclusion of the cryptographic function, calculating a tracer sum (eT,T) of all the tracer values;

performing one of the calculation of sum of tracer values (T) or the sum of verification values (A) on encrypted values (et, e$\alpha$) and performing the other of the calculation of the sum of tracer values or the sum of verification values on plaintext values (t, $\alpha$); and comparing the calculated tracer sum (T, ET) with the expected verification sum (A,EA).

2. The method for securing a white box cryptographic function computation on a cryptographic device such that a cryptography key K, used to encrypt a plaintext into a ciphertext, is not used in a plaintext form of claim 1, the method comprising:

encrypting the homomorphic decryption key ($DK_{HE}$) with an alternate homomorphic encryption key ($EK'_{HE}$) corresponding to an alternate homomorphic decryption key ($DK'_{HE}$) thereby producing an encrypted cryptography key ($\{DK_{HE}\}_{EK'_{HE}}$) that is used to perform a key-exchange operation for a message encrypted using the homomorphic decryption key ($DK_{HE}$) into a message encrypted using the alternate decryption key ($DK'_{HE}$);

provisioning the cryptographic device with the alternate decryption key ($DK'_{HE}$);

performing a key-exchange operation to cause the cryptographic function output to be encrypted using the alternate homomorphic encryption key ($EK'_{HE}$) corresponding to the alternate homomorphic decryption key ($DK'_{HE}$) by decrypting the cryptographic function output ($\{M\}_{EK_{HE}}$) thereby producing a key-exchanged cryptographic function output ($\{M\}_{EK'_{HE}}$, $\{S\}_{EK'_{HE}}$);

decrypting the key-exchanged cryptographic function output using the alternate decryption key ($DKey'_{HE}$) thereby producing a cryptography output message corresponding to the first message wherein the cryptography output message has a value equivalent of the cryptography operation performed on the first message using the cryptography key (K) without using the cryptography key (K) in plaintext on the cryptographic device.

3. The method for securing a white box cryptographic function computation on a cryptographic device such that a cryptographic key K, used to encrypt a plaintext into a ciphertext, is not used in a plaintext form of claim 2, further comprising:

determining a first random sequence ($r_i$);

setting each tracer value to the corresponding verification value encrypted using a key that includes random number values from the first random sequence;

computing a summation random value (R) that is a function of the random values used to encrypt the tracer values; and encrypting the verification sum (eA') with a key that includes the summation random value.

4. The method for securing a white box block cipher computation on a cryptographic device such that a cryptographic key K, used to encrypt a plaintext, into a ciphertext, is not used in a plaintext form of claim 2, wherein the first message is formatted according to a predetermined secret format and wherein the decrypting of the key-exchanged block cipher output step further comprising verifying that the message corresponds to the predetermined secret format before performing decryption step thereby preventing encrypted keys from being decrypted.

5. The method for securing a white box block cipher computation on a cryptographic device such that a cryptographic key K, used to encrypt a plaintext into a ciphertext, is not used in a plaintext form of claim 2, wherein the first message ($\{C\}EK_{HE}$) is a ciphertext message to be decrypted and the cryptographic operation on the first message using the encrypted cryptography key is a cryptographic decryption operation, the cryptography function output ($\{M\}_{K_{HE}}$) is an encryption of the plaintext message M encrypted using the first homomorphic public key ($EK_{HE}$), wherein the key-exchange operation causes the cryptographic function output ($\{M\}_{EK_{HE}}$) to be encrypted using a second homomorphic key ($EK'_{HE}$) thereby producing a key-exchanged cryptographic function output ($\{M\}_{EK'_{HE}}$) that is the plaintext message (M) encrypted using the second homomorphic key; and wherein decrypting the key-exchanged cryptographic function output message produces the message M that is a plaintext message that has a value equivalent of a cryptographic decryption operation performed on the first message using the cryptography key (K) without using the cryptography key (K) in plaintext on the cryptographic device.

6. The method for securing a white box block cipher computation on a cryptographic device such that a cryptographic key K, used to encrypt a plaintext into a ciphertext, is not used in a plaintext form of claim 2, wherein the first message (m) is a message to be cryptographically signed and the cryptographic operation on the first message using the encrypted cryptography key is a cryptographic signature operation, the cryptography function output ($\{S\}_{EK_{HE}}$) is an encryption of the plaintext message S encrypted using the first homomorphic public key ($EK_{HE}$), wherein the key-exchange operation causes the cryptographic function output ($\{S\}_{EK_{HE}}$) to be encrypted using a second homomorphic key ($EK'_{HE}$) thereby producing a key-exchanged cryptographic function output ($\{S\}_{EK'_E}$) that is a cryptographic signature encrypted using the second homomorphic key; and wherein decrypting the key-exchanged cryptographic function output message produces the message M that is a cryptographically signed output message that has a value equivalent of a cryptographic signature operation performed on the first message using the cryptography key (K) without using the cryptography key (K) in plaintext on the cryptographic device.

7. The method for securing a white box block cipher computation on a cryptographic device such that a cryptographic key K, used to encrypt a plaintext into a ciphertext, is not used in a plaintext form of claim 3 further comprising:
computing a summation (eA) of the encrypted verification values encrypted using the key that includes random number values from the first random sequence;
verifying the tracer computation based on a comparison of the summation of the encrypted verification values and the encrypted verification sum and the tracer sum.

8. The method for securing a white box block cipher computation on a cryptographic device such that a cryptography key K, used to encrypt a plaintext into a ciphertext, is not used in a plaintext form of claim 1, further comprising:
determining a pseudorandom sequence (r) based on a seed (R) such that an element of the pseudorandom sequence is associated with an element of the verification values;
provisioning the cryptographic device with an array of verification values ($\alpha_{ij}$), wherein a verification value ($\alpha_{ij}$) is associated with each step (j) of each computation block (i) of a cryptographic function, and an encrypted verification sum (EA) computed by encrypting each verification value associated with each step of each computation block ($\alpha_{ij}$) using a tracer key ($EK_{Tracer}$) and the corresponding random value from the pseudorandom sequence, and adding the encrypted verification values into an encrypted verification sum (EA);
wherein the step of performing a cryptographic operation (513''') further comprises:
determining a tracer value ($T_i$) indicative of computation of all steps of each computation block;
determining a summation random value (ri) corresponding to the random values ($r_{ij}$); and
encrypting a tracer value ($ET_i$) using the tracerkey ($EK_{Tracer}$) and the summation random value (ri); and
comparing a summation of the tracer values (ET) with the encrypted verification sum (EA) and taking a corrective action of the summation of the tracer values is not equal to the encrypted verification sum.

9. A cryptographic device having a secured white box cryptographic function computation whereby a cryptography key K, used to encrypt a plaintext into a ciphertext, is not used in a plaintext form, the cryptographic device operable to:
receive a first message ($\{C\}_{PK_{HE}}$ or m);
receive a message ($\{K\}_{EK_{HE}}$) containing a cryptography key (K) encrypted using the first homomorphic encryption key ($EK_{HE}$) using a homomorphic encryption scheme;
perform a cryptographic operation on the first message using the encrypted cryptography key ($\{K\}_{EK_{HE}}$) thereby producing a cryptography function output ($\{M\}_{EK_{HE}}$ or $\{S\}_{EK_{HE}}$) encrypted using the first homomorphic encryption key ($EK_{HE}$);
associate each step j of each computation block i of the cryptographic operation with a verification value ($e\alpha_{ij}$, $\alpha_{ij}$) and verification sum (A,EA) wherein one of the verification sum (EA) is an encryption of the sum of the verification values ($\alpha_{ij}$) or the verification sum (A) is the sum of plaintext values ($\alpha_{ij}$) corresponding to the verification values ($e\alpha_{ij}$);
use homomorphic encryption, to encrypt one of the verification value and the verification sum and not encrypting the other of the verification value and the verification sum; and
for each step j of each round i of the cryptographic function, assign a tracer value ($t_{ij}$,$et_{ij}$) with the verification value corresponding to that step i,j;
at the conclusion of the cryptographic function, calculate a tracer sum (eT,T) of all the tracer values;
perform one of the calculation of sum of tracer values (T) or the sum of verification values (A) on encrypted values (et, e$\alpha$) and performing the other of the calculation of the sum of tracer values or the sum of verification values on plaintext values (t, $\alpha$); and
compare the calculated tracer sum (T, ET) with the expected verification sum (A,EA).

10. The cryptographic device having a secured white box cryptographic function computation whereby a cryptography key K, used to encrypt a plaintext into a ciphertext, is not used in a plaintext form of claim 9, the cryptographic device further comprising:
an alternate decryption key ($DK'_{HE}$) corresponding to an alternate homomorphic encryption key ($EK'_{HE}$);
the cryptographic device further operable to:
receive an encrypted cryptography key ($\{DK_{HE}\}_{EK'_{HE}}$) that is used to perform a key-exchange operation for a message encrypted using the homomorphic decryption key ($DK_{HE}$) into a message encrypted using the alternate decryption key ($DK'_{HE}$), the encrypted cryptography key ($\{DK_{HE}\}_{EK'_{HE}}$) being an encryption of the homomorphic decryption key ($DK_{HE}$) using the alternate encryption key ($EK'_{HE}$);
perform a key-exchange operation to cause the cryptographic function output to be encrypted using the alternate homomorphic encryption key ($EK'_{HE}$) corresponding to the alternate homomorphic decryption key ($DK'_{HE}$) by decrypting the cryptographic function output ($\{M\}_{EK_{HE}}$) thereby producing a key-exchanged cryptographic function output ($\{M\}_{EK'_{HE}}$, $\{S\}_{EK'_{HE}}$);
decrypt the key-exchanged cryptographic function output using the alternate decryption key ($DKey'_{HE}$) thereby producing a cryptography output message corresponding to the first message wherein the cryptography output message has a value equivalent of the cryptography operation performed on the first message using the cryptography key (K) without using the cryptography key (K) in plaintext on the cryptographic device.

11. The cryptographic device having a secured white box cryptographic function computation whereby a cryptography key K, used to encrypt a plaintext into a ciphertext, is not used in a plaintext form of claim 10, further operable to:
determine a first random sequence ($r_i$);
set each tracer value to the corresponding verification value encrypted using a key that includes random number values from the first random sequence;
compute a summation random value (R) that is a function of the random values used to encrypt the tracer values; and
encrypt the verification sum (eA') with a key that includes the summation random value.

12. The cryptographic device having a secured white box cryptographic function computation whereby a cryptography key K, used to encrypt a plaintext into a ciphertext, is not used in a plaintext form of claim 10, wherein the first message is formatted according to a predetermined secret format and wherein the decrypting of the key-exchanged block cipher output step further comprising verifying that the message corresponds to the predetermined secret format before performing decryption step thereby preventing encrypted keys from being decrypted.

13. The cryptographic device having a secured white box cryptographic function computation whereby a cryptography key K, used to encrypt a plaintext into a ciphertext, is not used in a plaintext form of claim 10,
wherein the first message ($\{C\}_{EK_{HE}}$) is a ciphertext message to be decrypted and the cryptographic operation on the first message using the encrypted cryptography key is a cryptographic decryption operation, the cryptography function output ($\{M\}_{EK_{HE}}$) is an encryption of the plaintext message M encrypted using the first homomorphic public key ($EK_{HE}$), wherein the key-exchange operation causes the cryptographic function output ($\{M\}_{EK_{HE}}$) to be encrypted using a second homomorphic key ($EK'_{HE}$) thereby producing a key-exchanged cryptographic function output ($\{M\}_{EK'_{HE}}$) that is the plaintext message (M) encrypted using the second homomorphic key; and
wherein decrypting the key-exchanged cryptographic function output message produces the message M that is a plaintext message that has a value equivalent of a cryptographic decryption operation performed on the first message using the cryptography key (K) without using the cryptography key (K) in plaintext on the cryptographic device.

14. The cryptographic device having a secured white box cryptographic function computation whereby a cryptography key K, used to encrypt a plaintext into a ciphertext, is not used in a plaintext form of claim 10,
wherein the first message (m) is a message to be cryptographically signed and the cryptographic operation on the first message using the encrypted cryptography key is a cryptographic signature operation, the cryptography function output ($\{S\}_{EK_{HE}}$) is an encryption of the plaintext message S encrypted using the first homomorphic public key ($EK_{HE}$), wherein the key-exchange operation causes the cryptographic function output ($\{S\}_{EK_{HE}}$) to be encrypted using a second homomorphic key ($EK'_{HE}$) thereby producing a key-exchanged cryptographic function output ($\{S\}_{EK'_{HE}}$) that is a cryptographic signature encrypted using the second homomorphic key; and
wherein decrypting the key-exchanged cryptographic function output message produces the message M that is a cryptographically signed output message that has a value equivalent of a cryptographic signature operation performed on the first message using the cryptography key (K) without using the cryptography key (K) in plaintext on the cryptographic device.

15. The cryptographic device having a secured white box cryptographic function computation whereby a cryptography key K, used to encrypt a plaintext into a ciphertext, is not used in a plaintext form of claim 11, the cryptographic device further operable to:
compute a summation (eA) of the encrypted verification values encrypted using the key that includes random number values from the first random sequence;
verify the tracer computation based on a comparison of the summation of the encrypted verification values and the encrypted verification sum and the tracer sum.

16. The cryptographic device having a secured white box cryptographic function computation whereby a cryptography key K, used to encrypt a plaintext into a ciphertext, is not used in a plaintext form of claim 9, the cryptographic device further operable to:
determine a pseudorandom sequence (r) based on a seed (R) such that an element of the pseudorandom sequence is associated with an element of the verification values;
provision the cryptographic device with an array of verification values ($\alpha_{ij}$), wherein a verification value ($\alpha_{ij}$) is associated with each step (j) of each computation block (i) of a cryptographic function, and an encrypted verification sum (EA) computed by encrypting each verification value associated with each step of each computation block ($\alpha_{ij}$) using a tracer key ($EK_{Tracer}$) and the corresponding random value from the pseudorandom sequence, and adding the encrypted verification values into an encrypted verification sum (EA);
wherein to perform said a cryptographic operation the cryptographic device is operable to:
determine a tracer value ($T_i$) indicative of computation of all steps of each computation block;
determine a summation random value (ri) corresponding to the random values ($r_{ij}$); and
encrypt a tracer value ($ET_i$) using the tracerkey ($EK_{Tracer}$) and the summation random value (ri); and
compare a summation of the tracer values (ET) with the encrypted verification sum (EA) and taking a corrective action of the summation of the tracer values is not equal to the encrypted verification sum.

* * * * *